(12) United States Patent
Ma et al.

(10) Patent No.: US 9,798,927 B2
(45) Date of Patent: Oct. 24, 2017

(54) MOBILE TERMINAL IRIS RECOGNITION METHOD AND DEVICE HAVING HUMAN-COMPUTER INTERACTION MECHANISM

(71) Applicant: BEIJING IRISKING CO., LTD, Beijing (CN)

(72) Inventors: Li Ma, Beijing (CN); Xingguang Li, Beijing (CN); Zhaofeng He, Beijing (CN); Xianchao Qiu, Beijing (CN)

(73) Assignee: BEIJING IRISKING CO., LTD, Beijing (CN)

( * ) Notice: Subject to any disclaimer, the term of this patent is extended or adjusted under 35 U.S.C. 154(b) by 0 days.

(21) Appl. No.: 15/222,609

(22) Filed: Jul. 28, 2016

(65) Prior Publication Data

US 2017/0017842 A1    Jan. 19, 2017

Related U.S. Application Data

(63) Continuation of application No. PCT/CN2015/071445, filed on Jan. 23, 2015.

(30) Foreign Application Priority Data

| Jan. 28, 2014 | (CN) | ............... 2014 1 0041416 |
| Jan. 28, 2014 | (CN) | ............... 2014 1 0042068 |
| Feb. 28, 2014 | (CN) | ............... 2014 2 0090333 U |
| Mar. 14, 2014 | (CN) | ............... 2014 1 0095055 |

(51) Int. Cl.
*G06K 9/00*    (2006.01)

(52) U.S. Cl.
CPC ....... *G06K 9/00617* (2013.01); *G06K 9/0061* (2013.01); *G06K 9/00597* (2013.01); *G06K 9/00899* (2013.01); *G06K 9/00926* (2013.01)

(58) Field of Classification Search
CPC ............. G06K 9/00617; G06K 9/0061; G06K 9/00899; G06K 9/00926; G06K 9/00607; G06K 9/00601; G06K 9/00614; H04N 7/18; G06T 7/408; G06T 2207/30216
See application file for complete search history.

(56) References Cited

U.S. PATENT DOCUMENTS

| 6,714,665 B1 * | 3/2004 | Hanna ...................... G06K 9/00 382/106 |
| 8,887,259 B1 * | 11/2014 | Harding ................. G06F 21/32 713/185 |

(Continued)

*Primary Examiner* — Amir Alavi
(74) *Attorney, Agent, or Firm* — Locke Lord LLP; Tim Tingkang Xia, Esq.

(57) ABSTRACT

A mobile terminal iris recognition device having a human-computer interaction mechanism, the device includes a human-computer interaction module, an image acquisition module, an iris image analysis and processing module, a feedback control module and a power supply module. Also provided is an iris recognition method utilizing the device. Compared with the related art, the method has great improvement in such aspects as miniaturization, mobility and usability, is provided with a mobile terminal iris recognition function with an active visual, tactile and auditory interaction mechanism, and also has the advantages of high accuracy of iris recognition, low power consumption, reasonable structural layout, strong interaction functions and the like.

7 Claims, 13 Drawing Sheets

(56) References Cited

U.S. PATENT DOCUMENTS

| | | | | |
|---|---|---|---|---|
| 2006/0104485 A1* | 5/2006 | Miller, Jr. | ......... | G06K 9/00979 382/115 |
| 2006/0147094 A1* | 7/2006 | Yoo | .................. | G06K 9/00604 382/117 |
| 2006/0222212 A1* | 10/2006 | Du | .................... | G06K 9/00597 382/115 |
| 2013/0063582 A1* | 3/2013 | Choi | .................. | G06K 9/00604 348/78 |
| 2015/0347841 A1* | 12/2015 | Mears | ................ | G06K 9/00604 348/46 |
| 2017/0017842 A1* | 1/2017 | Ma | .................... | G06K 9/00597 |
| 2017/0147864 A1* | 5/2017 | Ahn | ................. | G06K 9/00087 |
| 2017/0193213 A1* | 7/2017 | Tsou | ...................... | G06F 21/32 |

* cited by examiner

MOBILE TERMINAL IRIS RECOGNITION METHOD AND DEVICE HAVING HUMAN-COMPUTER INTERACTION MECHANISM

CROSS-REFERENCE TO RELATED APPLICATIONS

This application is a continuation of International Patent Application No. PCT/CN2015/071445, filed Jan. 23, 2015, which itself claims the priority to Chinese Patent Application Nos. 201410041416.8 filed Jan. 28, 2014, 201410042068.6 filed Jan. 28, 2014, 201420090333.3 filed Feb. 28, 2014, and 201410095055.5 filed Mar. 14, 2014 in the State Intellectual Property Office of P.R. China, which are hereby incorporated herein in their entireties by reference.

FIELD OF THE INVENTION

The present invention relates to an iris recognition device and method, and in particular to a mobile terminal iris recognition method and device having a human-computer interaction mechanism.

BACKGROUND OF THE INVENTION

With the development of mobile internet technology, the use of mobile terminals for information processing, communication and even transaction is increasing. A large amount of business or privacy information is saved in the mobile terminals such as a mobile phone, etc., so that the mobile terminal, information security of the Internet and on-line transaction security have received increasing concern and attention. People tend not to set a boot password when using mobile terminals such as the mobile phone, a tablet computer, a laptop computer etc., and therefore once the mobile terminals such as the mobile phone are stolen or lost, the information stored will be inevitably leaked, leading to serious mental damage and property losses. In particular, problems of information security and identity authentication on mobile intelligent terminals become increasingly prominent.

For safety and convenience considerations, intelligent terminals have begun to be integrated with biometric recognition function for identity authentication. Mobile apparatus have been successfully integrated with a face recognition or fingerprint recognition device for identity recognition. However, these identity recognition devices have disadvantages, for example, the recognition accuracy of face recognition technology is low, thus may not be used independently to solve problems of high level information security such as serving as an alternative to online payment password. The shortcoming of the fingerprint recognition technology lies in that when it is integrated in the mobile terminal, a fingerprint acquisition hardware module is additionally required, which leads not only to an aesthetically spoiled appearance and an increased volume of the mobile terminal, but also an increased cost. In addition, as a person's fingerprint is easy to forge, the fingerprint recognition technology can be disadvantageous for information security of a higher level. Moreover, as a feature exposed at the surface of a human body, the fingerprint is also vulnerable to being damaged by outside influence, thus cannot serve as an effective and stable identity recognition method. Compared with the face recognition and fingerprint recognition technologies, iris recognition has the advantages of high uniqueness, high stability, non-invasiveness, etc.

To sum up, for the problems and new trends mentioned above, an optical path design, an imaging module, etc., in an existing iris recognition device are unable to meet the requirement for miniaturization. Besides, the iris recognition method has low computing efficiency and is susceptible to noise, thus there still remains large room for improvements in accuracy, real-time performance, etc. How to design and achieve an accurate and rapid iris image quality detection method that may be applicable to complex scenes remains an ongoing challenge. In order to solve the above problems, the present invention designs and develops an iris image recognition device with rich interaction functions which may be applied to mobile terminals and a method thereof.

SUMMARY OF THE INVENTION

An object of the present invention is to provide a mobile terminal iris recognition device having a human-computer interaction mechanism, which comprises a human-computer interaction module, an image acquisition module, an iris image analysis and processing module, a feedback control module and a power supply module, wherein the human-computer interaction module is used for allowing a user to configure said mobile terminal iris recognition device and achieve a human-computer interaction function with said device during iris image acquisition and processing; said image acquisition module is used for acquiring an iris image of the user and transferring the image to said iris image analysis and processing module for processing; said iris image analysis and processing module is used for analyzing and processing said acquired iris image and transferring processing results or instructions to said feedback control module; said feedback control module is used for feeding back the processing results of the iris image analysis and processing module to said image acquisition module, so as to adjust imaging parameters of said image acquisition module, and for feeding back the processing results of the iris image analysis and processing module also to said human-computer interaction module, so as to guide the user as to how to use said device; and said power supply module is used for supplying power to said device.

The present invention also provides an iris recognition method using said mobile terminal iris recognition device, wherein said iris image analysis and processing module of said mobile terminal iris recognition device is used for recognizing the acquired iris images or feature templates extracted from the iris images in accordance with the following steps: a) performing similarity comparisons between said iris images or feature templates and at least one existing template of a user template library to obtain an comparison score; b) calculating the probability of said feature templates being stolen templates based on said comparison score; c) determining whether said probability exceeds a threshold, if no, proceeding to step d; and if yes, proceeding to step e; d) determining said feature templates as normal feature templates, and determining the recognition as a pass; and e) determining said feature templates as stolen templates and the recognition as abnormal.

Finally, there is provided a smart apparatus comprising the above technical scheme, which is any one selected from the group consisting of a smart phone, a tablet computer, a smart wearable apparatus, a smart watch, smart glasses, a smart wristband, a smart door lock.

To sum up, compared with the prior art, the mobile terminal iris recognition device having the human-computer interaction mechanism of the present invention has made great improvements in such aspects as miniaturization, mobility and usability, and has the advantages of high accuracy of iris recognition, low power consumption, reasonable structural layout, strong interaction functions, etc.

It is to be understood that both the foregoing general description and the following detailed description are exemplary and explanatory and should not be construed as limitations on what is claimed in the invention.

BRIEF DESCRIPTION OF THE DRAWINGS

Further objects, functions and advantages of the present invention will be illustrated by the following description of the embodiments of the invention with reference to the accompanying drawings, in which.

DETAILED DESCRIPTION OF THE INVENTION

Figure 1:
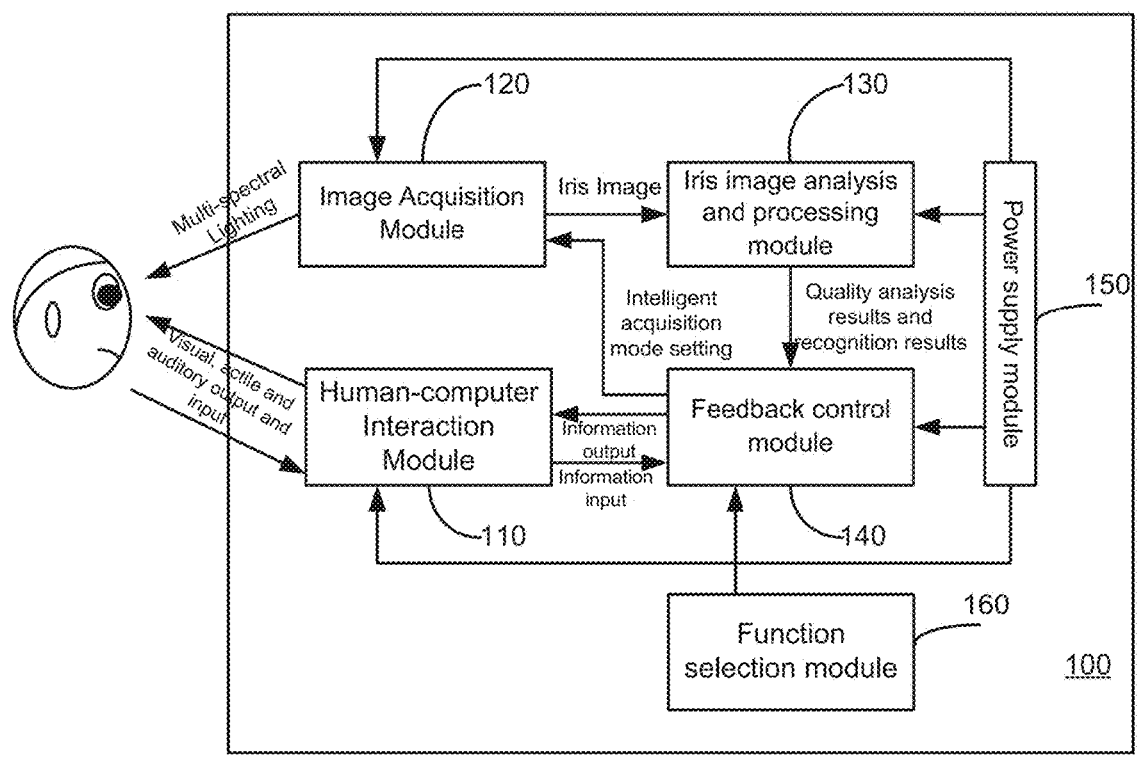
FIG. 1 shows a block diagram of a system of an iris image mobile terminal iris recognition device having a human-computer interaction mechanism according to the present invention.

Objects and functions of the present invention as well as methods for realizing these objects and functions will be elucidated with reference to exemplary embodiments. However, the present invention is not limited to the following disclosed exemplary embodiments, but may be implemented in different ways. The description of the invention is merely provided to assist those of ordinary skill in the art in a comprehensive understanding of specific details of the invention in nature.

Hereinafter, embodiments of the present invention will be described with reference to the drawings. In the drawings, like reference numerals designate like or similar parts or steps.

According to the present invention, a mobile terminal iris recognition method and device having a human-computer interaction mechanism is provided for addressing problems that it is difficult for a conventional iris image forming device and recognition system to achieve miniaturization and mobility, and the mobile terminal iris recognition device and method are actually operable and easy to use. The present invention designs and develops a new-generation iris recognition method and device which is user-friendly and may be applied to mobile terminals. In particular, provided is a mobile terminal iris recognition method and device having an human-computer interaction mechanism.

FIG. 1 shows a block diagram of components of a system of a mobile terminal iris recognition device 100 having an active visual, tactile and auditory interaction mechanism according to the present invention. The device 100 comprises a human-computer interaction module 110, an image acquisition module 120, an iris image analysis and processing module 130, a feedback control module 140 and a power supply module 150.

In particular, the human-computer interaction module 110 is used for accomplishing a plurality of human-computer interaction functions such as visual, tactile and auditory functions, etc., during iris image acquisition and processing, so as to allow a user to configure the device 100 and acquire recognition information.

The image acquisition module 120 is used for achieving autofocus iris image acquisition. Hereinafter, the specific embodiments will be described with reference to FIG. 2B-FIG. 4C.

The iris image analysis and processing module 130 is used for analyzing and processing the acquired iris images, and transferring processing results or instructions such as focusing control instructions, image quality results, etc., to the feedback control module 140. According to an embodiment, the iris image analysis and processing module 130 may comprise, for example, an iris image processing module, an image processor and a memory. The iris image analysis and processing module 130 is used for analyzing and processing the acquired iris images, such as quality judgment, autofocus calculation, feature extraction, comparison, etc. The iris image processing and analysis may be run by the image processor and memory. During image processing, already existing calculation units such as an Intel processor of a laptop computer or an ARM processor of a smart-phone within mobile platforms including the smart-phone, the laptop computer, the tablet computer may be used directly to achieve functions of an image processing unit, or a specialized graphics processor such as ARM, DSP, etc., may be configured for performing the image processing. All these different ways are intended to fall within the spirit and essence scope of the present invention.

The feedback control module 140 is used for feeding back image analysis and processing results obtained by the iris image analysis and processing module 130 to the image acquisition module 120, and making intelligent adjustments to imaging parameters of the optical acquisition module 120 according to a preset rule. Meanwhile, the feedback control module 140 is also used for feeding back the image analysis and processing results obtained by the image processing module 130 to the human-computer interaction module 110, and outputting according to the preset rule so as to provide the user with guidance and feedback.

The power supply module 150 is used for supplying power to the mobile terminal iris recognition device, and may be realized by, for example a rechargeable battery. In the case that the apparatus to which the mobile terminal iris recognition device 100 belongs has no AC power supply, the power supply module supplies power to the device 100. When the apparatus is plugged into the AC power supply, the power supply module may be charged. A detailed description of each module will be given below with reference to the drawings.

Figure 2A:
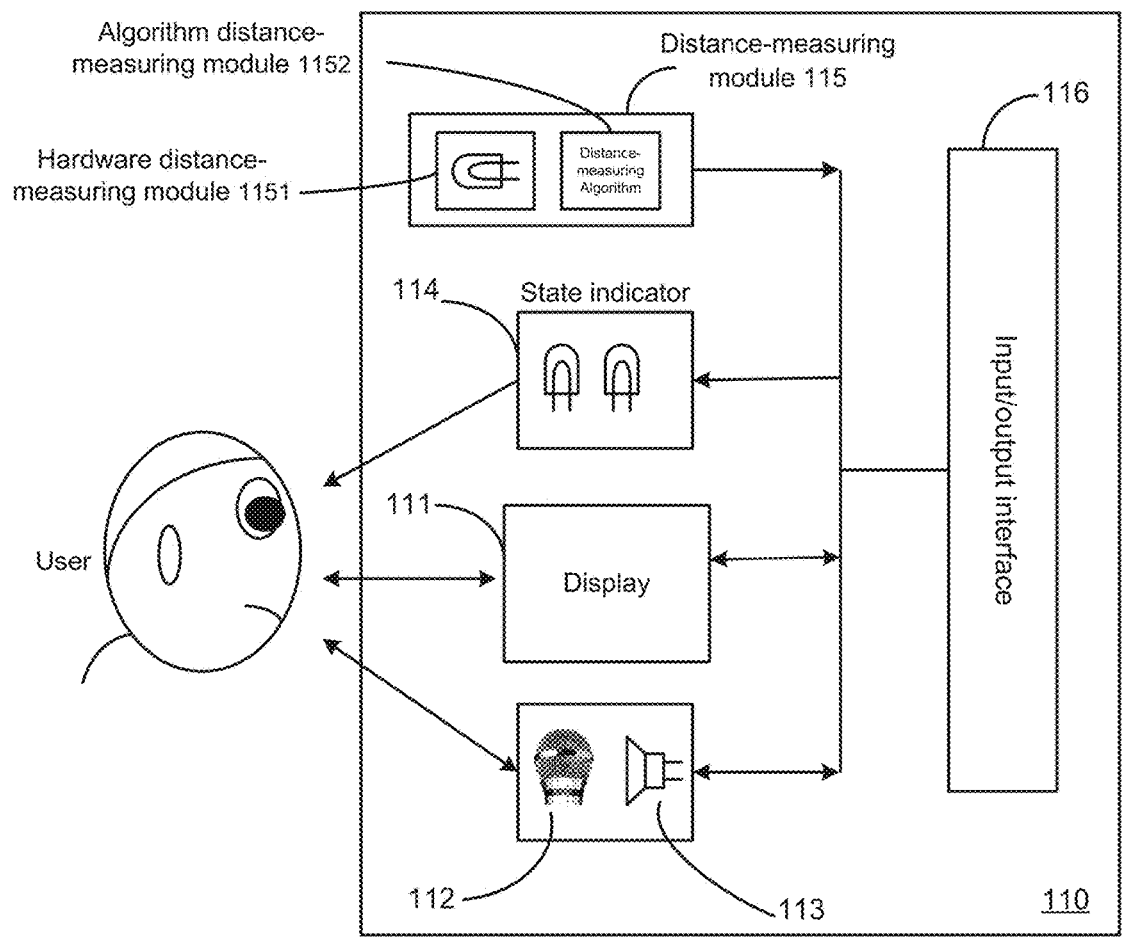
FIG. 2A shows a block diagram of an embodiment of the human-computer interaction module shown in FIG. 1.

FIG. 2A further shows a block diagram of an embodiment of the human-computer interaction module 110 of FIG. 1. According to an embodiment of the present invention, the human-computer interaction module 110 may comprises, for example a display screen 111 having a multi-touch function, a microphone 112 having a voice acquisition function, a loud speaker 113 having a voice output function, a status indicator 114 for indicating the status, a distance measuring module 115 and an input/output interface 116. The human-computer interaction module 110 is used for accomplishing a plurality of human-computer interaction functions such as visual interaction, tactile interaction and auditory interaction, etc., during the iris image acquisition and processing, thereby guiding the user to use the iris recognition system and improving user friendliness. In particular, the human-computer interaction module 110 mainly fulfills the following functions:

a) active visual feedback: displaying user information acquired in real time through a display screen in video, so as to allow the user to make a quick adjustment to an optimal acquisition position according to the video he or she has seen;

b) image analysis and processing results display: displaying determined image quality results such as being clear, not clear, please stay away, etc., obtained by an image processing algorithm through analysis in real time through the display screen, and feeding it back to the user in different colors or languages, so as to allows the user to perceive the present acquisition state in real time;

c) control parameter input: The user may configure the parameters of the system and carry out feedback and interaction with respect to the acquisition processing through the display screen 111. For example, the user may specify positions that need focusing by clicking regions of interest through a touch screen. The image processing algorithm may also obtain a rough estimate of an iris center by means of the regions of interest input by the user, achieving a function of coarse positioning of the iris images. Again, for example, during registration, an operator (or the user him/herself) may select the images acquired by a registration algorithm through the touch screen. For example, clicking on the screen means that the image is accepted, while crossing the screen means that the image is rejected. Again, for example, through the touch screen, the system may be controlled, for example, using the touch screen for setting apparatus parameters, inputting the user's identity card number and password, confirming the output results of the apparatus, etc. Preferably, the display screen is provided with the multi-touch function to achieve better user manipulation.

d) voice input: the active human-computer interaction module 110 may receive voice commands input by the user through the built-in microphone 112, and perform corresponding operations.

e) auditory feedback: through the loud speaker having the voice output function, the system may feed feedback commands, image analysis and processing results, recognition and authentication results, etc. back to the user by voice, thereby increasing the convenience of use. For example, user position prompt information such as "please stay away", "please come closer", "please keep" obtained by the image processing algorithm or the distance measuring module through analysis may be fed back to the user by voice to prompt the user to make position adjustment.

f) indicating function: the active human-computer interaction module 110 may also preferably includes the status indicator 114 for indicating the status, which may be realized by an indicator light emitting light of a specific color, through which the image analysis and processing results, the recognition and authentication results, etc., may be displayed. For example, a green indicator light may indicate that the recognition passes, while a red indicator light may indicate that the recognition fails.

g) distance measuring function: the active human-computer interaction module 110 may further achieve the distance measuring function and be used for measuring a distance between the user and an iris optical imaging device at present in real time, so as to obtain an optimal iris imaging effect. As shown in FIG. 2A, the distance measuring module 115 consists of a hardware distance measuring module 1151 and an algorithm distance measuring module 1152, wherein the hardware distance measuring module 1151 measures the distance d1 between the user and the mobile terminal iris recognition device 100 by emitting infrared light or laser; and the algorithm distance measuring module 1152 estimates the distance d2 between the user and the device using an calculated iris radius of the acquired iris images. The distance values estimated by the hardware distance measuring module 1151 and the algorithm distance measuring module 1152 are fused after being filtered, and thus the user's estimated distance D is obtained.

Figure 2B:
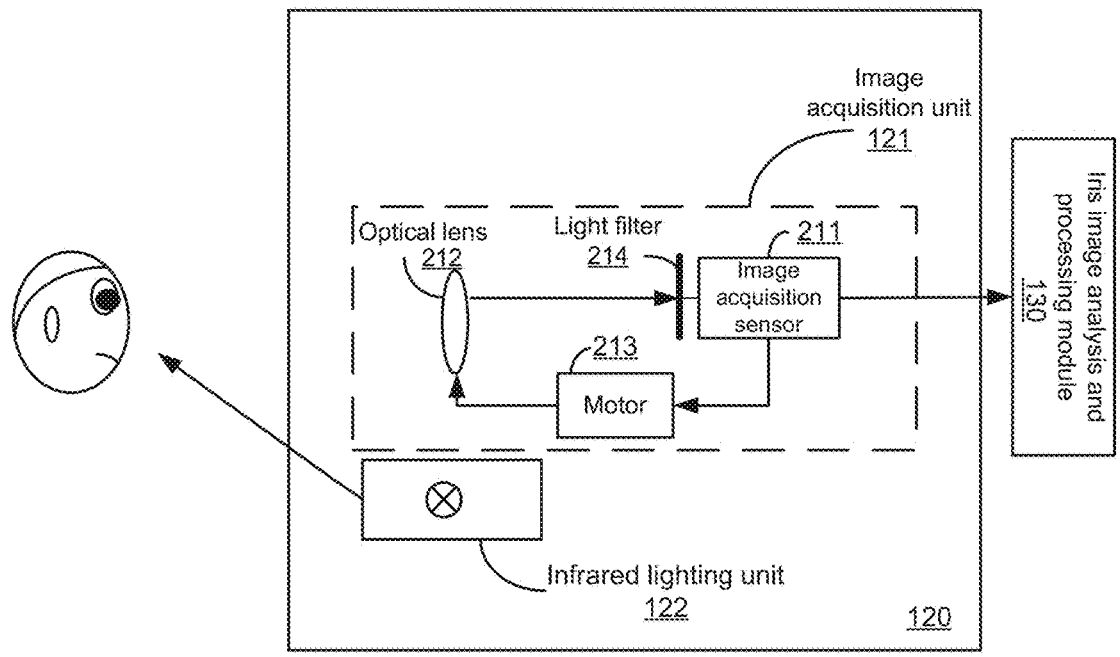
FIG. 2B is a block diagram showing components of an embodiment of an optical acquisition module for said iris images shown in FIG. 1.

FIG. 2B is a block diagram further showing components of an embodiment of the optical acquisition module 120 for the iris images shown in FIG. 1. As shown in FIG. 2B, the image acquisition module 120 consists of an image acquisition unit 121 and an infrared lighting unit 122. According to an embodiment, the image acquisition unit 121 consists of an image acquisition sensor 211, an iris acquisition optical lens 212 and a zoom motor 213 and is used for realizing autofocus iris image acquisition. The image acquisition unit 121 can be used both as a front camera placed at the front end of a mobile apparatus and as a rear camera placed at the rear end of the mobile device. According to an embodiment, an image acquisition distance is 5-30 cm, with an effective depth of field being more than 10 cm.

The infrared lighting unit 122 is used for emitting infrared light. FIGS. 2C-2F show the infrared lighting unit according to an embodiment of the present invention.

Figure 2C:
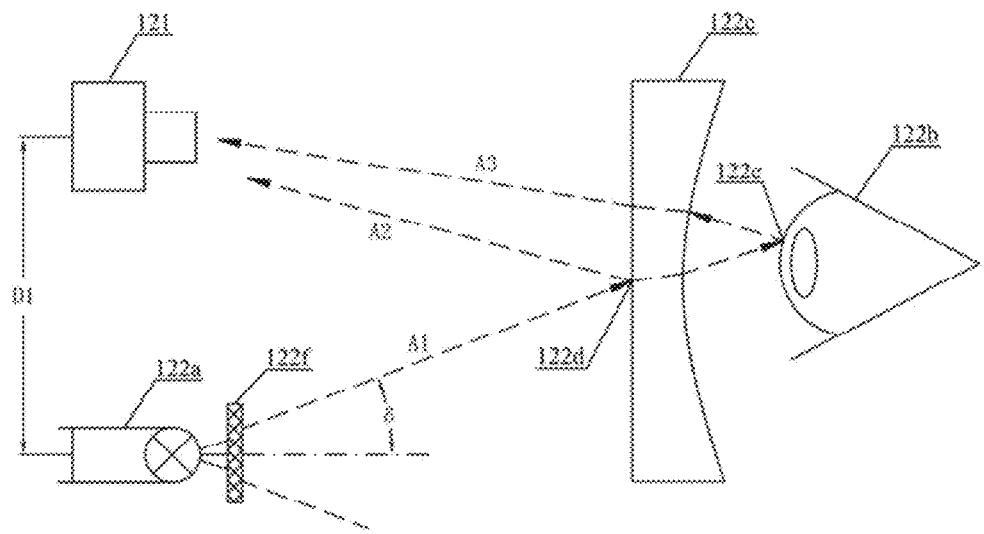
FIGS. 2C-2F show an infrared lighting unit according to an embodiment of the present invention.

As shown in FIG. 2C, the infrared lighting unit 122 may sequentially comprise one or more groups of infrared lamps 122*a* along an emitting direction of the infrared light and a diverging lens 122*f* located in front of the infrared lamps 122*a*. The infrared lamps 122*a* are preferably infrared LEDs. The diverging lens 122*f* is arranged such that the infrared lighting unit 122 is able to emit the infrared light at a divergence angle. The infrared light has a central wavelength of preferably 850 nm, with a half divergence angle being 7 to 30 degrees. The diverging lens 122*f* may for example be selected from optical lenses such as a convex lens, a concave lens, a Fresnel lens, etc. Said diverging lens 122*f* allows the divergence angle at which the infrared lighting unit 122 emits the infrared light to be greater than a field angle of the image acquisition unit 121.

According to an embodiment of the present invention, the infrared lighting unit 122 may operate in different power consumption modes. Among them, a low power consumption mode is for eye detection, glasses detection, distance determination and autofocus; a mid power consumption mode is for photographing of iris images of naked eyes; and a high power consumption mode is for photographing of iris images when a pair of glasses are worn. When the infrared lighting unit 122 operates in low power consumption mode, the intensity of the infrared light is not strong enough for iris image acquisition, so that such functions as eye detection, glasses detection, position detection, etc., may be performed, and feedback signals may be given to prompt the user to make position adjustment. When a proper position adjustment is made, the infrared lighting unit 122 may be switched to a normal power consumption mode. In the normal power consumption mode, the brightness of an infrared flash lamp is adjusted depending on whether the user wears the glasses, so as to photograph clear iris images that are not occluded by light spots.

The switch and selection of the above-mentioned different operating modes of the infrared lighting unit 122 may be performed according to actual use occasions. In particular, when the infrared lighting unit 122 operates in the high power consumption mode for a long time, as a long-time exposure of the eyes to the infrared light presents safety hazards, and the high-brightness infrared lighting unit 122 also has a high power consumption at the same time, a determination may be made as to whether a time that the infrared lighting unit 122 operates in the high power consumption mode reaches a certain threshold. If the time is too long before the threshold is reached, the iris recognition device 100 re-enters the low power consumption mode of the infrared lighting unit 122 or shut down.

According to an embodiment of the present invention, the image acquisition unit 121 may provide synchronous control signals to the infrared lighting unit 122 at the same time to control the operation of the latter, that is, to ensure that the infrared lighting unit 122 emits infrared light at precisely the same time when the image acquisition unit 121 acquires the iris images, while the infrared lighting unit 122 is shut down when no iris images need to be acquired, thereby reducing the power consumption of the apparatus.

According to an embodiment of the present invention, the image acquisition unit 121 has an equivalent focal length of 2.5 to 5 mm; an aperture ranging from 2.0 to 2.8; a lens mount with a diameter Φ of 4 mm to 8 mm; and a total optical length of 3 mm to 6 mm. Said image acquisition unit 121 may be a fixed focus module or an autofocus module. Moreover, the image acquisition unit 121 may also be an image acquisition unit which shares the mobile terminals.

According to an embodiment of the present invention, the image acquisition unit 121 and infrared lighting unit 122 have a center-to-center spacing of at least 5 mm. According to an embodiment, when the image acquisition unit 121 is used for acquiring a person's binocular iris images, the center-to-center spacing of the infrared lighting unit 122 and the image acquisition unit 121 is 5-10 mm, preferably 5 mm; while when the image acquisition unit 121 is used for acquiring a person's monocular iris images, the center-to-center spacing of the infrared lighting unit 122 and the image acquisition unit 121 is 30 to 40 mm, preferably 35 mm.

FIG. 2C schematically shows a principle diagram of the iris image acquisition and processing with the user wearing eyeglass lenses 122*c*. As shown in FIG. 2C, taking one of the lenses 122*c* as an example, the infrared light A1 emitted by the infrared lighting unit 122 is incident on the lens 122*c* to form a light spot 122*d*, infrared light A2 as which the infrared light A1 is reflected by the lens 122*c* enters the image acquisition unit 121, thus the light spot is formed and may occlude the iris image of the eye 122*b*. In addition, the infrared light A1 may also form a light spot 122*e* on a cornea of the eye 122*b* after being reflected by the lens 122*c*, and the light spot 122*e* is located within a pupil. Further, the infrared light A1 forms infrared light A3 after being reflected by the eye 122*b* and refracted by the lens 122*c*. The light acquired by the image acquisition unit 121 may include the infrared light A3 and the infrared light A2, and the infrared light A2 entering the image acquisition unit 121 should be reduced as much as possible since it may affect the clarity of the iris image and the iris recognition results.

As shown in FIG. 2C, when a distance D1 between the infrared lighting unit 122 and the image acquisition unit 121 increases, an included angle δ between a line connecting the infrared lighting unit 122 and the eye 122*b* and a horizontal plane (i.e., a half angle of the divergence angle α) also increases. When D1 is large enough, the infrared light A2 cannot enter the image acquisition unit 121. In general, however, due to the limitation on size and space of a front panel of the mobile terminal, the distance D1 between the infrared lighting unit 122 and the image acquisition unit 121 cannot be increased unrestrictedly, and too large a distance may also affect the aesthetic appearance of the mobile terminal and the effect of user experience. The above iris recognition device 100 according to the present invention may not only improve the accuracy of iris recognition, but also optimize the arrangement of the infrared lighting unit 122 and the image acquisition unit 121 on the mobile terminal by selecting the proper distance D1 and being provided with the suitable divergence angle δ.

Figure 2D:
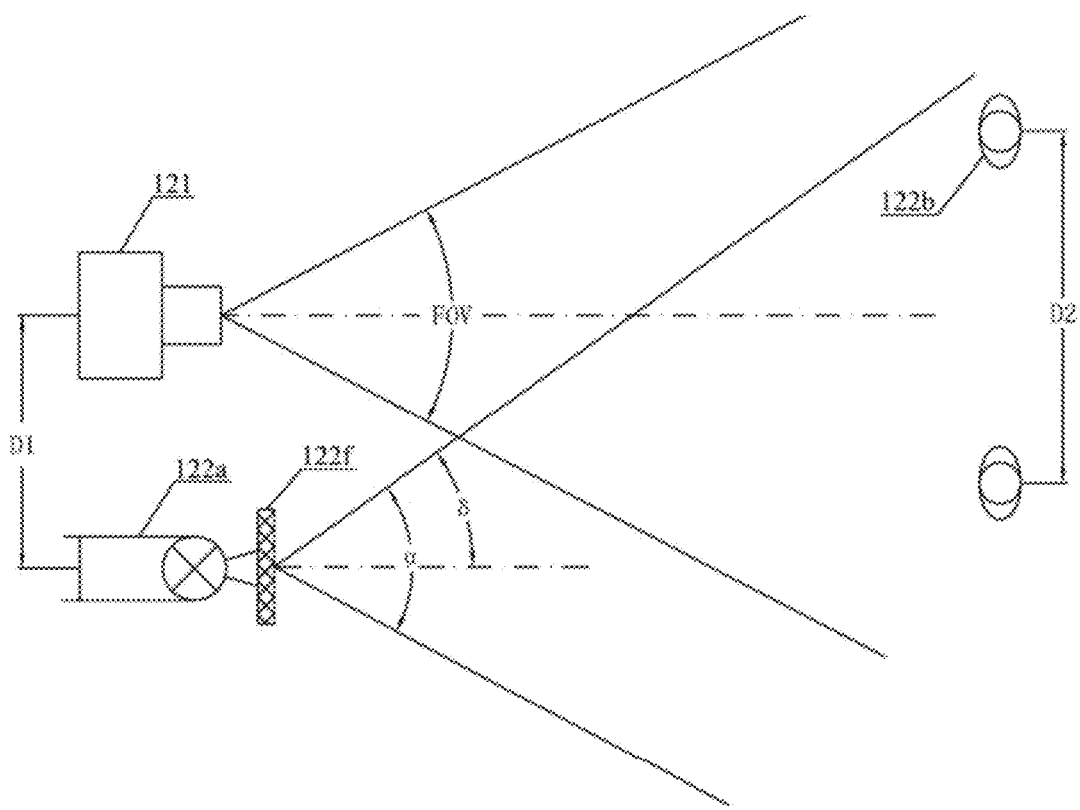

FIG. 2D is a schematic view showing the principle of the iris recognition device 100 being used for recognition of two eyes 122*b* according to another embodiment of the present invention. In the case of binocular recognition, a center of a line connecting the user's two eyes is typically arranged to correspond to the position of the image acquisition unit 121 to enhance the user experience. According to this embodiment, as shown in FIG. 2D, one infrared lighting unit 122 is utilized, and the center-to-center spacing D1 between the infrared lighting unit 122 and the image acquisition unit 121 is set to be 5-10 mm, preferably 5 mm. A diverging lens 122*f*, which may adjust the divergence angle at which the infrared light is emitted by the infrared lighting unit 122, is also provided in a light emission direction of the infrared lighting unit 122, and the included angle δ between the infrared lighting unit 122 and the eyes 122*b* is related to D1 and an object distance between the lens and eyes and is preferably set to be as large as possible. Preferably, when D1 is 10 mm, and the object distance is 150 mm, the included angle δ is greater than 5 degrees. More preferably, the included angle δ is 7 to 30 degrees. The field angle of the image acquisition unit 121 is FOV, and the diverging lens 122*f* of the infrared lighting unit 122 is adjusted to allow the divergence angle α at which the infrared light is emitted by the infrared lighting unit 122 is greater than the field angle of the image acquisition unit 121. Preferably, α is 10 degrees greater than the FOV. Thus, not only can lightening effects be ensured, but also a waste of energy can be avoided.

Figure 2E:
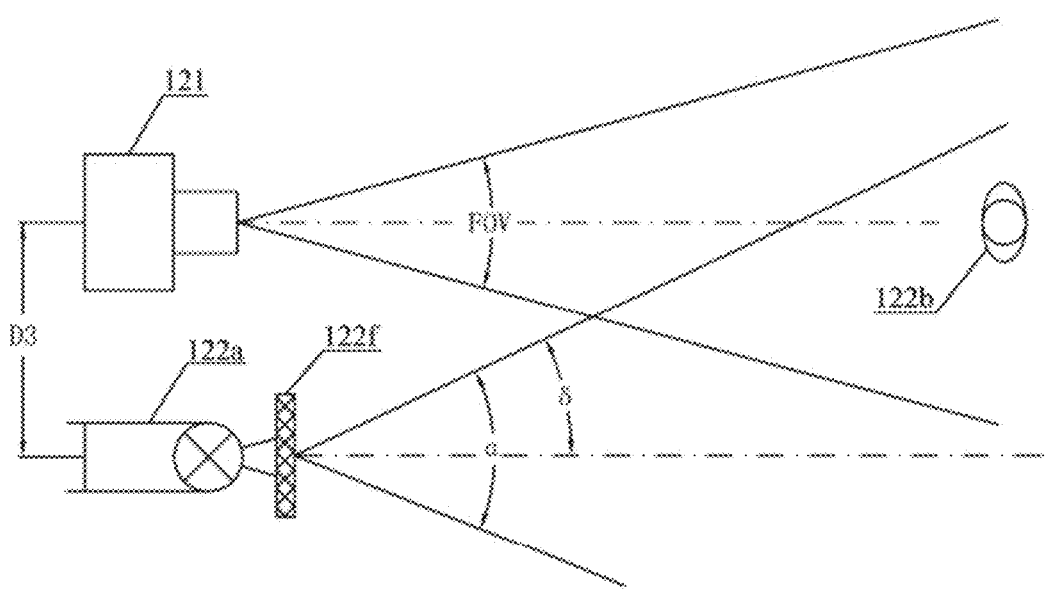

FIG. 2E is a schematic view showing the principle of the iris recognition device 100 being used for recognition of a single eye according to yet another embodiment of the present invention. In the case of monocular recognition, the iris center of the user's eye is typically arranged to correspond to the position of the image acquisition unit 121.

According to this embodiment, as shown in FIG. 2E, one infrared lighting unit 122 is utilized, and the center-to-center spacing D1 between the infrared lighting unit 122 and the image acquisition unit 121 is set to be larger compared to the case of binocular recognition, for example 30-40 mm, preferably 35 mm. A diverging lens 111, which may adjust the divergence angle at which the infrared light is emitted by the infrared lighting unit 122, is also provided in the light emission direction of the infrared lighting unit 122, and the included angle δ between the infrared lighting unit 122 and the eye 122b is related to D1 and the object distance between the lens and the eye and is preferably set to be as large as possible. Preferably, when D1 is 40 mm, and the object distance is 150 mm, the included angle δ is greater than 15 degrees. The field angle of the image acquisition unit 121 is FOV, and the diverging lens 111 of the infrared lighting unit 122 is adjusted to allow the divergence angle α at which the infrared light is emitted by the infrared lighting unit 122 is greater than the field angle of the image acquisition unit 121. Preferably, α is 10 degrees greater than the FOV.

Figure 2F:
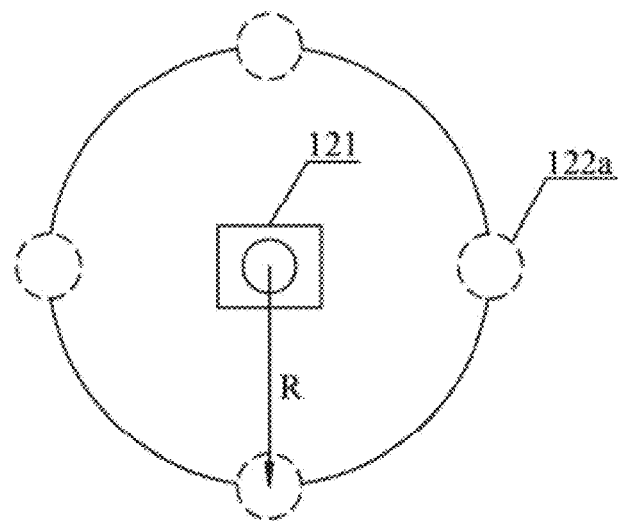

FIG. 2F shows a positional relationship between the image acquisition unit 121 and the infrared lighting unit 122 which may be located at any position of a circumference centered at the center of the image acquisition unit 121 and has a radius of R. It is preferable that the infrared lighting unit 122 is arranged directly below the image acquisition unit with a distance of 5 mm. According to a conventional design of the front panel of the mobile terminal, the infrared lighting unit 122 may be arranged on the left or right of the image acquisition unit 121.

The control method using the iris recognition device including the above infrared lighting unit 122 is described specifically as follows.

At Step S201, the user activates the iris recognition device 100 and makes the latter operates in the low power consumption mode. Specifically, activation of the image acquisition unit 121 is controlled through the iris image analysis and processing module 130, and control signals are sent to the power supply module 150 to make it operates in the low power consumption mode at the same time. At this time, the infrared lighting unit 122 will emit infrared light having lower brightness.

At Step S202, in the low power consumption operating mode, the image acquisition unit 121 acquires eye detection images and calculates the positions of the eyes. Specifically, the image acquisition unit 121 acquires relatively dark images which do not satisfy the requirements of iris recognition, but meet the requirements of face images required by detection of the eyes 122b. Meanwhile, whether the user's eyes 122b are located within a range of light emitted by the infrared lighting unit 122 is further determined. If the eyes 122b are located within the range of the infrared light, as human beings have a pupillary distance D2 of about 65 mm, the iris image analysis and processing module 130 may also estimate the position and distance of the user to the image acquisition unit 121 based on the distance value represented in pixels between the two eyes 122b in the face image.

At Step S203, a determination is made as to whether the distances between the eyes 122b and the image acquisition unit 121 are appropriate, that is, whether the distance satisfies the requirements of the iris recognition. If the requirements are satisfied, whether the user wears the lenses 122c is further recognized (step S205); and if the relative distance between the eyes and the image acquisition unit 121 is not appropriate, the iris image analysis and processing module 130 may generate corresponding feedback signals and prompt the user to adjust the distance (step S204). For example, the user may be prompted to come closer to or stay away from the image acquisition unit 121 so as to adjust the distance between the user and the image acquisition unit 121; or to translate leftward or rightward to allow the two eyes 122b of the user to be located at a center of the picture photographed as well as at a center of an illumination area of the infrared lighting unit 122.

These feedback information may all be fed back by the feedback control module 140 which may utilize the functions of the mobile terminal to feed the prompt information back to the user, for example the display screen or the loud speaker and a vibration motor of the mobile terminal. Meanwhile, the method returns to step S202 for redetection.

In addition, if the image acquisition unit 121 has the autofocus function, the image acquisition unit 121 may make focus adjustment and accomplish autofocus with the aid of the infrared lighting unit 122.

At Step S205, according to the distribution of light spots around the eye, it may be further analyzed and determined whether the user wear the lenses 122c. If the user does not wear the lenses 122c, the infrared lighting unit 122 starts with the mid power consumption mode (step S206), and the recognition may begin after the iris images are photographed. If the user wears the lenses 122c, the infrared lighting unit 122 starts with the high power consumption mode (step S207) to give a certain increase in light intensity so as to compensate for the infrared light intensity scattered and absorbed by the lenses 122c, which makes the iris images photographed clearer, thereby facilitating the iris recognition. If a red-eye phenomenon occurs with the images photographed, illumination intensity control and adjustment are needed. For example, the brightness of a liquid crystal screen of the mobile terminal is increased to make the pupils of the user smaller, thereby relieving the red-eye phenomenon.

At Step S208, the iris image acquisition and recognition may be performed after the selection of the mid power consumption mode (step S206) or the high power consumption mode (step S207). The iris image analysis and processing module 130 processes each of the images and determines whether the iris can be recognized (step S211). Once the iris image is clear and recognizable, iris recognition results may be obtained, and the whole iris recognition process ends. After that, the iris image analysis and processing module 130 shuts down the image acquisition unit 121, and controls the power supply module 150 not to supply power to the infrared lighting unit 122 at the same time.

According to an embodiment of the present invention, as a long-time exposure of the eyes to the infrared light presents safety hazards, and the high-brightness infrared lighting unit 122 also has a high power consumption at the same time, a determination may also be made as to whether a time that the infrared lighting unit 122 operates in the high power consumption mode is too long (step S209). If the time is too long, the iris recognition device 100 enters the low power consumption mode of the infrared lighting unit 122 (step S201) and guide the user to readjust the position.

The iris image analysis and processing module of the present invention confirms that the ambient light is bright or dark and whether glasses reflections are present or not, respectively, by acquiring gray level distribution, saturation, and the number of high-light spots of the image, and further adaptively adjust the operating mode of the infrared lighting unit.

By configuring the diverging lens and the relative position between the above-mentioned infrared lighting unit 122 according to the present invention and the iris image acquisition unit, the infrared lighting unit is made to firstly emit low-intensity infrared light when iris recognition is required, so as to perform eye detection and interactions with the user, and then optimal intensity adjustment is made to the infrared lighting unit to allow acquisition of sharp iris images no matter the user wears glasses or not, thereby ensuring the accuracy of iris recognition. In the present invention, as a segmented light intensity control is adopted, and the light intensity adjustment is made according to whether the user wears glasses, unnecessary current consumption may be saved, and the lifetime of the battery may be prolonged compared to the adjustment manner of ordinary infrared light emitting unit.

Figure 3A:
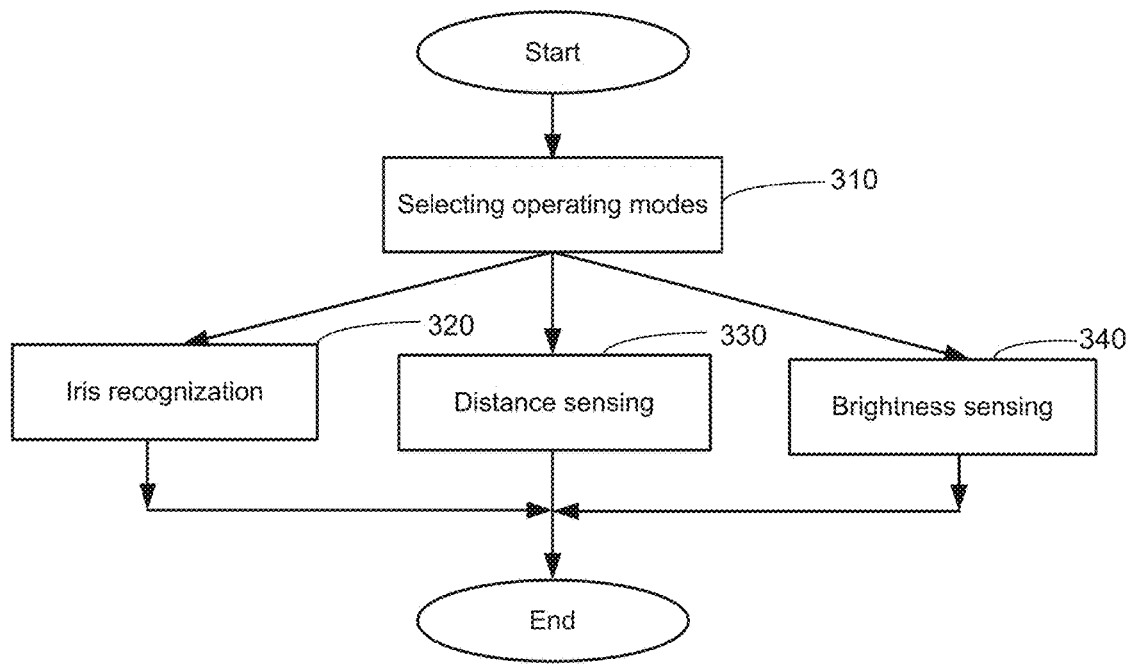
FIG. 3A shows a flow chart of selecting operating modes using a multifunctional mobile intelligent terminal sensor supporting iris recognition of the present invention.

Return to FIG. 1, the mobile terminal iris recognition device 100 according to the present invention further comprises a function selection module 160 for controlling the image acquisition module 120 to operate in different function modes. Specifically, as shown in FIG. 3A, the image acquisition module 120 may operate in any one of the following four function modes: (a) iris recognition, (b) iris recognition and distance sensing, (c) iris recognition and brightness sensing, and (d) iris recognition, distance sensing and brightness sensing.

In the iris recognition operating mode and the distance sensor operating mode, the image acquisition module 120 according to the present invention may provide infrared light source. The image acquisition module 120 is capable of acquiring images of different resolution. For example, when high-resolution iris images are acquired, the resolution is preferably not less than 640*480, namely not less than 300 K. Low resolution is for example a resolution of 100*100. When the infrared light source is provided, it is ensured that an active light source has for example a light power between 1 mw/cm$^2$ and 10 mw/cm$^2$. The light power is for example about 5 mw/cm$^2$ in a medium lighting state. Operating conditions of various modes will be described specifically below.

(1) Iris Recognition Operating Mode 320

In the process of image acquisition, distance prompts are made, human-computer interactions are performed, the brightness for image acquisition is ensured, and too strong illumination is avoided to protect the eyes, thereby facilitating the acquisition of qualified iris images. User identity authentication is realized through image analysis, quality determination and comparison, ensuring the information security of the intelligent terminal user.

Figure 3B:
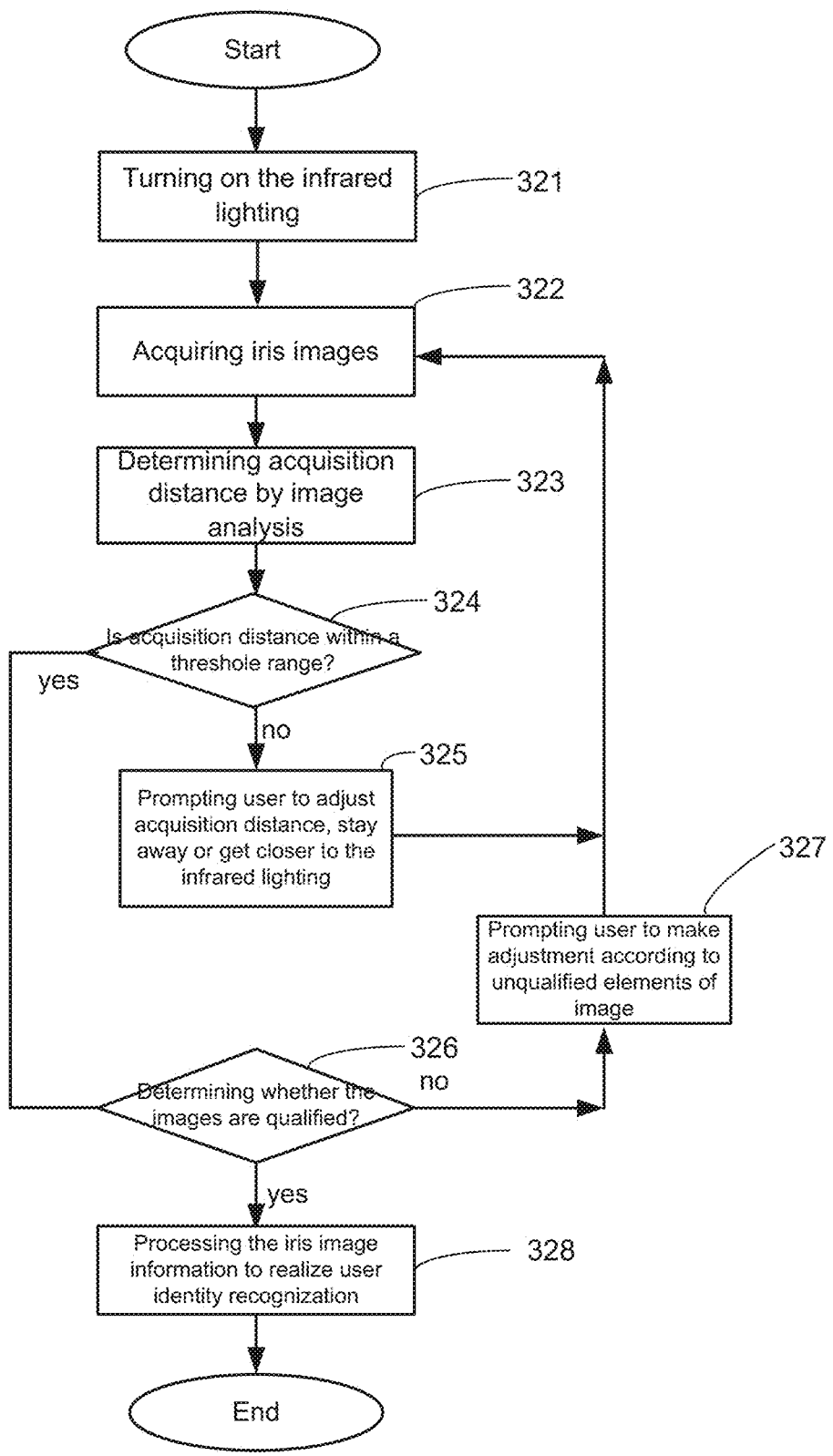
FIG. 3B schematically shows a flow chart of a method of an iris recognition operating mode.

FIG. 3B schematically shows a flow chart of a method of the iris recognition operating mode 320, which is described in greater detail as follows.

A. at step 321, when the mobile terminal activates the iris recognition function, the function selection module 160 notifies the feedback control module 140 to enter the iris recognition operating mode 320, and the feedback control module 140 controls the optical image acquisition module 120 to turn on the infrared light source to provide infrared light and set the lighting state to the medium lighting state. If the lighting intensity is graded on a scale of 1-5, the lighting state of the infrared light source may be graded as 3. As for the light power of the active light source, more particularly, it should be ensured that the light power is for example between 1 mw/cm$^2$ and 10 mw/cm$^2$. The light power is for example about 5 mw/cm$^2$ in the medium lighting state.

B. at step 322, the feedback control module 140 controls the optical image acquisition module 120 to acquire iris images under the infrared lighting conditions. Preferably, high-resolution images are acquired. For example, when high-resolution iris images are acquired, the resolution is preferably not less than 640*480, namely not less than 300 K.

C. at step 323, the image analysis and processing module 130 analyzes the iris images to obtain characteristic values of the images, then determines the current acquisition distance of the user according to the characteristic values, and finally outputs analysis results to the feedback control module 140. The characteristic values may be brightness values of the images, the size of the iris radius, etc.

Figure 3C:
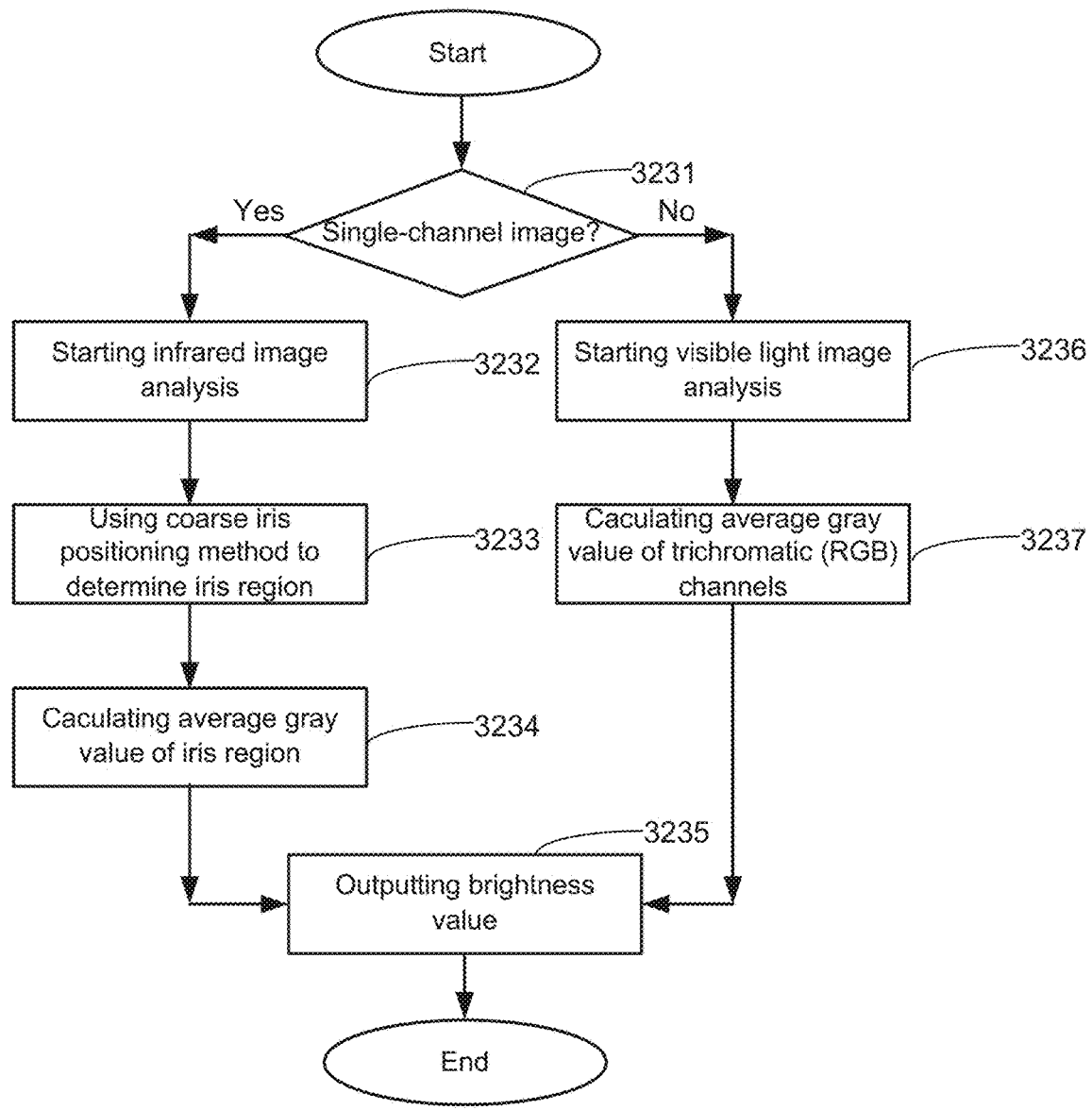
FIG. 3C schematically shows a flow chart of a method for calculating image brightness when performing image analysis in the iris recognition operating mode.

FIG. 3C schematically shows a flow chart of a method for calculation of image brightness, which is described in greater detail as follows.

At Step 3231, determining whether the images are single-channel images of the iris images acquired from one eye, If yes, proceeding to step 3232; and if no, proceeding to 3236;

At Step 3232, starting near infrared image analysis;

At Step 3233, using an coarse iris positioning method to determine an iris region;

At Step 3234, calculating an average gray value of the iris region;

At Step 3235, outputting brightness value, and the process ending at this point;

At Step 3236, starting visible light image analysis;

At Step 3237, calculating the average gray value of trichromatic (RGB) channels, then proceeding to step 3235.

Here, there is a correspondence between the characteristic values of the iris images and the acquisition distance. For example, in the case that the characteristic values selected are the brightness values of the iris images, if the brightness exceeds a threshold range, it means that the acquisition distance exceeds a threshold range.

D. at step 324, the image analysis and processing module 130 determines whether the acquisition distance is within the threshold range, if yes, proceeding to step 326; and if no, proceeding to step 325;

E. at step 325, the image analysis and processing module 130 outputs the determined results outside the threshold range to the feedback control module 140 and prompts the user to make position adjustment. The method returns to step 322 after a predetermined waiting time.

Specifically, if the acquisition distance is above the threshold range, that is, the acquisition distance is too large, the feedback control module 140 prompts the user to get closer to a sensor for sensing through the human-computer interaction module 110; and If the acquisition distance is below the threshold range, that is, the acquisition distance is too small, the feedback control module 140 controls the optical image acquisition module 120 to turn off the infrared lighting and prompts the user to stay away from the infrared lighting.

As the iris acquisition has a certain range, that is, the iris recognition can only be performed within a certain distance range in front of the lens, prompting the user through human-computer interaction enables performing of the iris recognition at a proper acquisition distance. In addition, according to the present invention, the external active infrared lighting used for iris recognition is typically a constant lighting, and therefore when the user is too close to the acquisition apparatus and the active lighting, the lighting at the eyes may be too strong, presenting a risk of affecting the security of the eyes. Thus, if the acquisition distance is too small, the infrared lighting is turned off, and the user is prompted to stay away from the sensor.

Here, after the infrared lighting is turned off, if the apparatus is still in the iris recognition state, the infrared lighting will be turned on after a period of time to continue with the iris recognition.

F. at step 326, the image analysis and processing module 130 determines whether the images are qualified, if yes, proceeding to step 328; and if no, proceeding to step 327. Here, the determination of the image quality comprises the following elements: occlusion score, iris-sclera boundary contrast, iris-pupil boundary contrast, clarity, motion blur, number of available grey levels, iris radius, pupil-iris concentric circle regularity, etc.

G. at step 327, if the images are determined to be unqualified, the image analysis and processing module 130 outputs the analysis results to the feedback control module 140 which notifies the user to make corresponding adjustments according to the unqualified elements through the human-computer interaction module 110, and then the method returns to step 322 to restart the iris image acquisition. In the case that the unqualified element is the occlusion score, the adjustments for example are fixing the hair or other items that occlude the eyes.

H. at step 328, the image analysis and processing module 130 performs image processing such as iris image comparison, etc., for example, comprising the following steps of: extracting iris information (or features) from qualified iris images; making a comparison between the iris information extracted and the iris information stored in an iris database of the intelligent terminal or a cloud server; and finding in the iris database the iris information similar to the acquired iris image information, thus realizing the iris recognition, authentication of the user identity, etc.

I. After completion of the iris recognition, the iris recognition operating mode is exited.

(2) Distance Sensing Operating Mode 330

During phone calls by the user, the distance sensing operating mode 330 of the multifunctional sensor is activated to prevent mis-operation, namely, when the distance between the user's face and the mobile intelligent terminal is smaller than a certain range, the screen is turned off and locked to prevent mis-operation. When the distance between the user's face and the mobile intelligent terminal is greater than a certain range, the screen is turned on and unlocked.

Figure 3D:
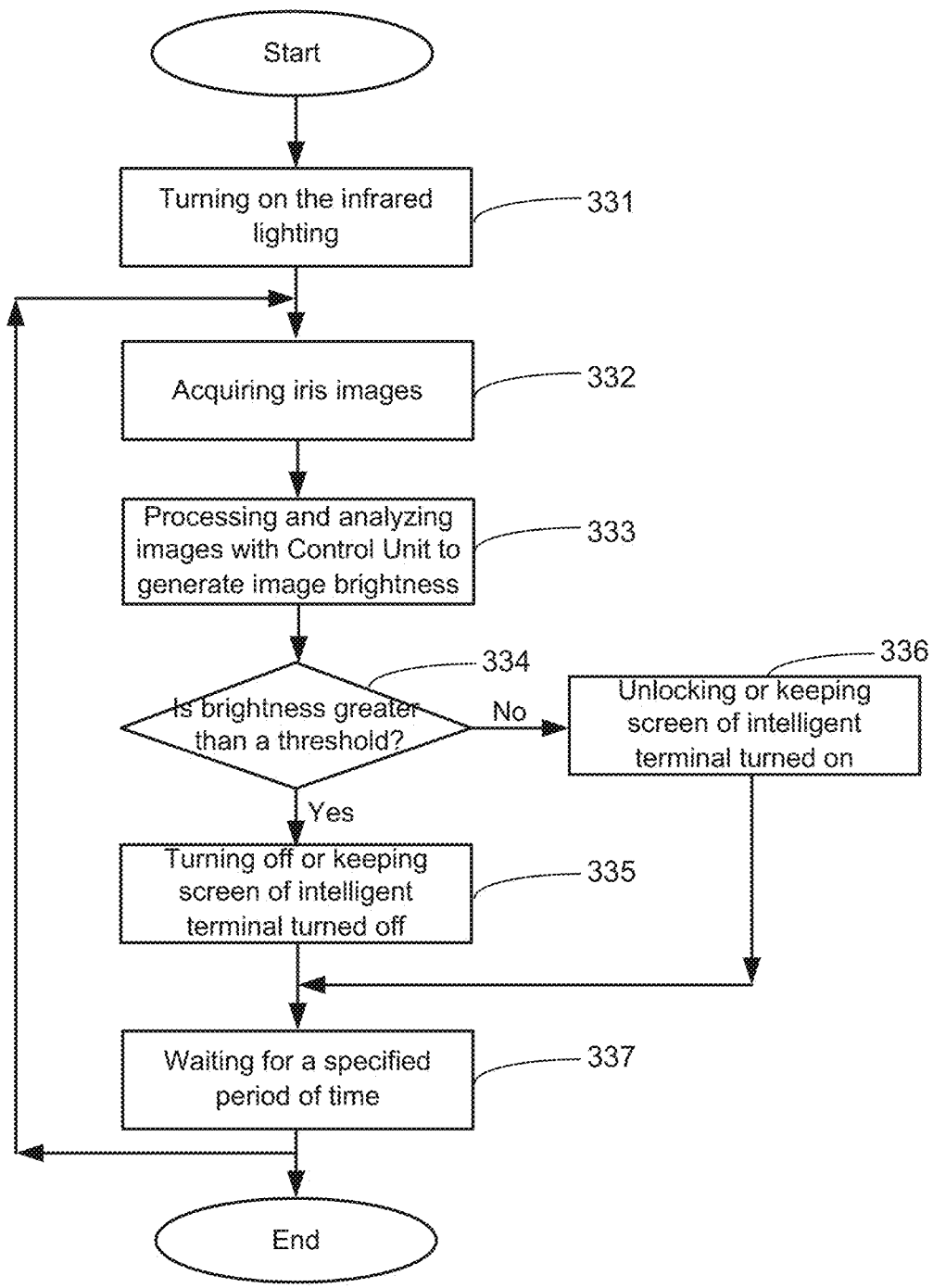
FIG. 3D schematically shows a flow chart of a method of a distance sensor operating mode.

FIG. 3D schematically shows a flow chart of a method of the distance sensing operating mode according to specific embodiments of the present invention, which is described in greater detail as follows.

At Step 331: when in a busy state, the function selection module 160 notifies the feedback control module 140 to enter the distance sensing operating mode, and the feedback control module 140 controls the optical image acquisition module 120 to turn on the infrared light source to provide infrared light and set the lighting state to a low lighting state. If the lighting intensity is graded on a scale of 1-5, the lighting state of the infrared light source may be graded as 1.

At Step 322, the feedback control module 140 controls the optical image acquisition module 120 to acquire infrared images under the infrared lighting conditions. Preferably, low-resolution images are acquired. Low resolution may be for example a resolution of 100*100.

At Step 333, the image analysis and processing module 130 processes and analyzes the images to derive the image brightness.

At Step 334, the image analysis and processing module 130 determines whether the image brightness is greater than the threshold, if yes, proceeding to step 335; and if no, proceeding to 336.

At Step 335, since the infrared lighting is provided, when the image brightness is greater than the threshold, it is indicated that the face is close to the screen at this time, then the image analysis and processing module 130 sends determination results to the feedback control module 140 which turns off and locks the screen of the intelligent terminal to keep the latter in a turned off state, so as to prevent mis-operation of the intelligent terminal. Then, the method proceeds to step 337.

At Step 336, when the image brightness is less than the threshold, it is indicated that there is a large distance between the and the screen at this time, then the screen of the intelligent terminal is unlocked or allowed to keep the previous state. Then, the method proceeds to step 337.

At Step 337, the feedback control module 140 waits for a specified period of time (t>=1 second), then the method returns to step 332 for infrared image reacquisition to achieve a continuous distance sensing function until the end of the call.

After the call ends, distance sensing operating mode is exited.

(3) Brightness Sensing Operating Mode 340

Through the real-time acquisition of images of the environment and image analysis, environmental illumination grade is determined, active adjustment of screen brightness is made, and eye comfort is ensured.

Figure 3E:
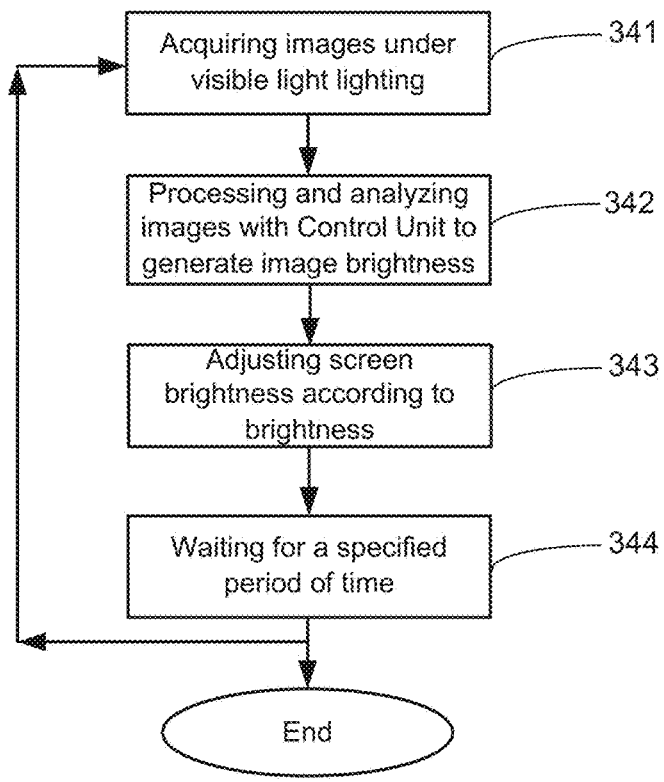
FIG. 3E schematically shows a flow chart of a method of a brightness sensor operating mode.

FIG. 3E schematically shows a flow chart of a method of the brightness sensing operating mode 340, which is described in greater detail as follows.

At Step 341, if the brightness sensing operating mode 340 is entered, the function selection module 160 notifies the feedback control module 140 to enter the brightness sensing operating mode 340, and the feedback control module 140 controls the optical image acquisition module 120 to acquire images under environmental lighting conditions. Preferably, low-resolution images are acquired. Acquisition time intervals may be set by the user him/herself.

At Step 342, the image analysis and processing module 130 processes and analyzes the images to derive the image brightness and then outputs analysis results of the image brightness to the feedback control module 140. Preferably, the image analysis and processing module 130 may analyze the brightness grade of the image and then only output the image brightness grade to the feedback control module 140. Here, each image brightness grade corresponds to a screen brightness most suitable for the current environment brightness.

At Step 343, the feedback control module 140 receives the image brightness output by the image analysis and processing module 130 and adjusts the brightness of the screen according to the corresponding screen brightness value of the brightness grade.

At Step 344, the feedback control module 140 waits for the specified period of time, and then the method returns to step 341 for image reacquisition under visible light lighting conditions to achieve a continuous brightness sensing function, wherein the specified time t>=1 second.

There are at least two ways for entering the brightness sensing operating mode:

a. a single use mode: The user may for example choose the brightness sensing operating mode 340 by clicking a button of the brightness sensor manually, then the mobile phone enters the brightness sensing operating mode. The multifunctional mobile intelligent terminal sensor according to the present invention detects the environment brightness for a single time and adjusts the screen brightness of the mobile phone according to detection results of the environment brightness.

b. an automatic setting mode: the function selection module 160 automatically selects the brightness sensing operating mode 340 as the operating mode, and then when neither is the iris recognition activated, nor is the mobile phone engaged in a call, the multifunctional mobile intelligent terminal sensor according to the present invention detects the environment brightness constantly and adjusts the screen brightness of the mobile phone according to the detection results of the environment brightness. If the iris recognition function is activated, the iris recognition operating mode 320 is entered; and if the mobile phone is engaged in a call, the distance sensing operating mode 330 is entered.

The above brightness sensing and distance sensing operating modes are merely exemplary, and the specific applications thereof may vary according to actual situations. For example, the distance sensing may also be used for sensing the distance between the mobile terminal and other objects as long as the measuring range is within the detection range, or for not only detecting the environment brightness, but also the brightness of specific spaces, etc. Variations of such applications all fall within the protection scope of the present invention.

Figure 4A:
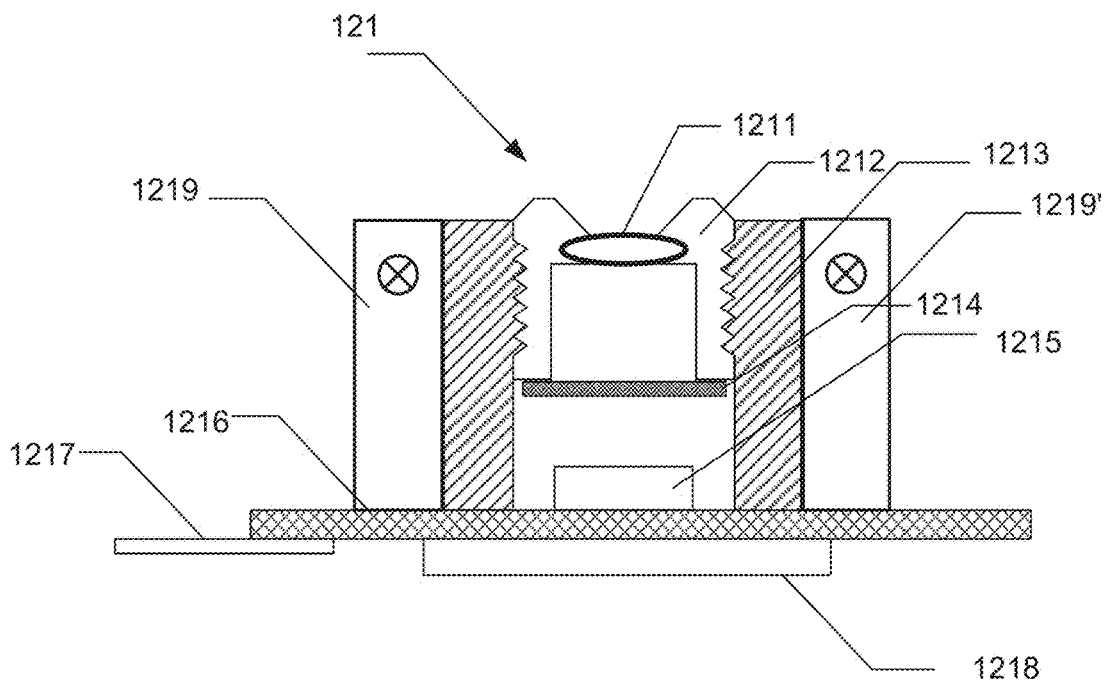
FIGS. 4A-4C show another embodiment of the image acquisition unit shown in FIG. 2B.
Figure 4B:
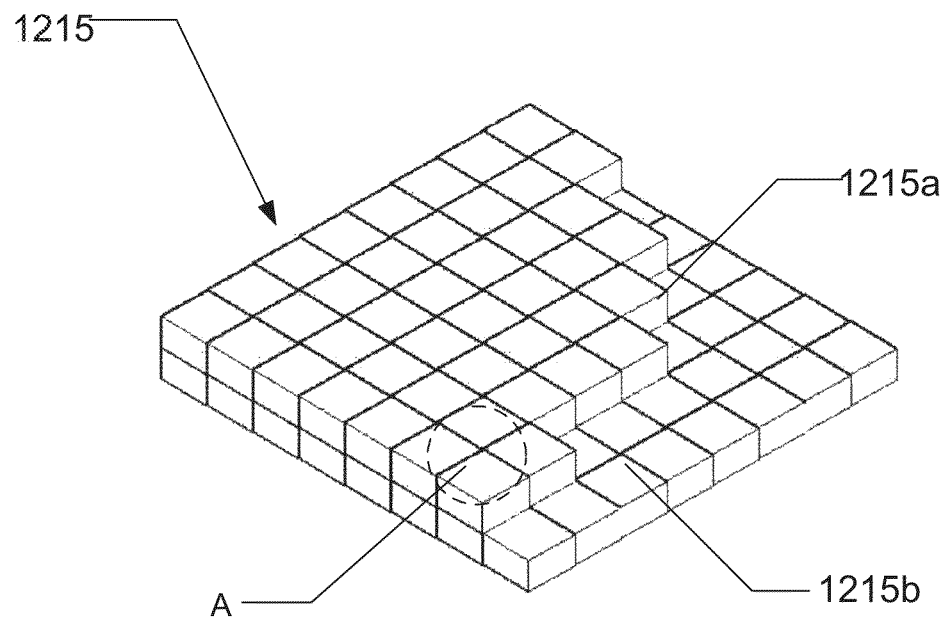
Figure 4C:
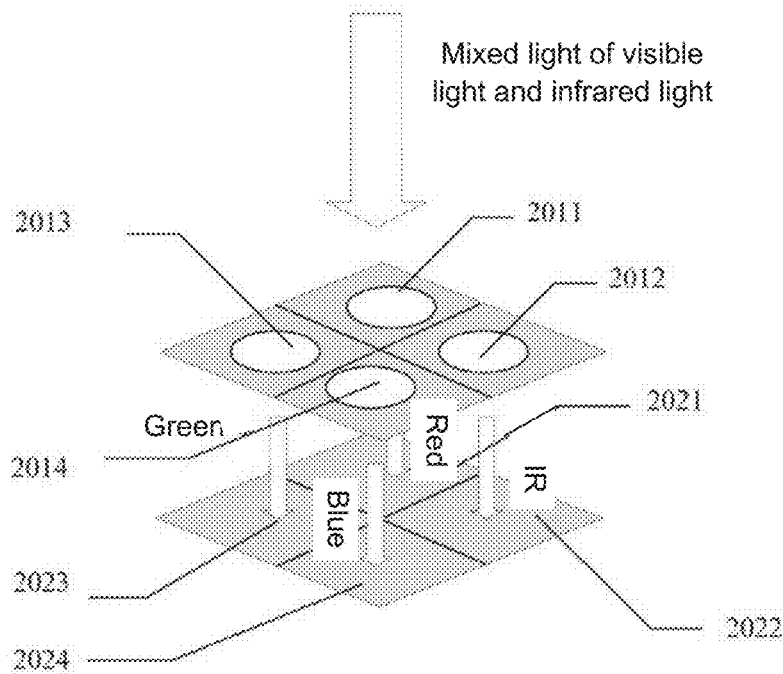

According to an embodiment of the present invention, FIGS. 4A-4C show another embodiment of the image acquisition unit 121 of FIG. 2B. As shown in FIG. 4A, the image acquisition unit 121 (also called optical acquisition module) comprises:

a lens group 1211 consisting of one or more lens elements which can converge or diverge the light;

a lens element seat 1212 for fixing the lens group to form an integral lens;

a lens mount 1213 rotatably holding the lens element seat 1212 for adjusting a focus point of the lens by rotating the lens or adjusting a voice coil motor to make the image sharp;

an image sensor 1215 capable of converting the energy of the light into digital signals to form digital images;

circuit boards 1216-1218 for transmitting or processing the digital signals; and infrared lighting units 1219 and 1219' for emitting infrared light which are only used in photographing the iris.

FIGS. 4B and 4C schematically show the whole and partial structural views of the image sensor 1215, respectively.

As shown in FIG. 4B, the image sensor 1215 comprises a micro filter layer 1215a near the lens and a photosensitive sensor 1215b located away from the lens.

The micro filter layer 1215a comprises a plurality of micro filter units arranged in arrays. The photosensitive sensor 1215b comprises a plurality of picture element units arranged vertically below respective micro filter units in a corresponding manner, each picture element unit corresponding to one pixel of the image.

As shown in FIG. 4C, the picture element units 2021-2024 are used for visible light imaging and for imaging in the iris recognition mode or the distance measuring mode, wherein the picture element units 2021-2024 each comprises a RGB-IR sensor and a bi-pass coating film, or comprises a common RGB sensor and a light filter switcher, wherein the switcher performs switching using two single-pass light filters, or using an all-pass light filter in combination with two single-pass light filters with the former serving as the base of the latter. Moreover, the switching may be performed using one bi-pass light filter in combination with one visible light single-pass light filter with the former serving as the base of the latter, that is, using a combination of a bottom light filter and an upper light filter, wherein the bottom light filter is an all-pass light filter, the upper light filter may be added with two single-pass light filters, a visible light filter and a near-infrared light filter, respectively, and the switching therebetween is performed by the switching device. It may also be arranged that the bi-pass light filter serves as the bottom light filter with one visible light filter added thereon. When switching is performed, the upper light filter may be switched in or out by the switching device, that is, when the upper light filter is switched in, there are two light filters which are combined, while when switched out, there is only the bottom bi-pass light filter.

As shown in FIG. 4C which is an enlarged view of part A taken from FIG. 4B, four adjacent upper, lower, left and right micro filter units 2011-2014 which form a square respectively belong to four types of filters which are respectively a red filter, a green filter, a blue filter and an infrared filter and transmit red, green, blue and infrared lights, respectively. There are a plurality of such parts A which is composed of four micro filter units in the micro filter layer 1215a, forming arrays of the micro filter units.

Specifically, the first micro filter unit 2011 is the red filter, and the fourth micro filter unit 2014 which is the blue filter is arranged diagonal to the first micro filter unit 2011. The second micro filter unit 2012 and the third micro filter unit 2013 which are arranged diagonally are the green filter and the infrared filter, respectively.

In other words, each filter unit can only transmit light of a corresponding color, and lights of other colors are all absorbed by the filter. Then, imaging of the colored lights passing through corresponding micro filter units 2011-2014 is performed by corresponding picture element units 2021-2024.

When imaging, for a daily photographing mode, RGB components of each pixel are calculated according to RGB color information obtained by adjacent picture element units to reproduce the true color of the picture; and for the iris recognition mode, IR component of each pixel is calculated according to infrared light information obtained by adjacent picture element units to obtain clear infrared light iris images.

As adjacent pixels are very small in size and are very near to each other, when images are obtained, an average value of color values of adjacent picture element units may be used to represent component of this color at this pixel. Other methods such as interpolation, etc., may also be used for calculation according to different applications.

Specifically, in the daily photographing mode, when image information of pixels corresponding to the position of for example the red filter unit 2011 is calculated, an average of blue value of four nearest blue picture element units is taken as the B component. Similarly, the average of green value of four nearest green picture element units is taken as the G component, thus the true color of the images photographed may be reproduced using the RGB components.

Similarly, in the iris recognition mode, when IR image information of pixels corresponding to the position of for example the red filter unit 2011 is calculated, the average of adjacent IR value will be used, thus a complete iris image may be obtained.

The lens of the optical acquisition module 121 has an equivalent focal length of 2.5-5 mm, an aperture ranging from 1.4-2.8; a lens mount with a diameter Φ of 4-8 mm; a total optical length of 3-6 mm. A finished optical acquisition module is 6*6 mm square at a minimum and 8.5*8.5 mm square at a maximum with a thickness of 4-10 mm.

According to another preferred embodiment of the present invention, a light filter 1214 is additionally provided between the lens group 1211 and the image acquisition sensor 1215, as shown in FIG. 4A. The light filter 1214 is formed using the bi-pass film coating technology with a thickness of 0.1-0.3 mm. It enables a transmission of 80%-95% for visible light having a wavelength range of 400-650 nm, and a transmission of 50%-95% for infrared light having a wavelength range of 750-1000 nm. The light filter 1214 is secured on the lens mount 1213 by gluing or other manner, allowing the optical acquisition module to be compact in structure.

Through the additional provision of the light filter 1214, light other than the infrared light and the visible light of a specified wavelength may be better filtered, thereby achieving a better imaging effect.

The image acquisition unit 121 may allow for photographing of visible light having a wavelength range of 400-650 nm and near-infrared light having a wavelength range preferably of 820-880 nm, and has common photographing functions as well as an extended function for iris image photographing such that the normal photographing and the iris recognition functions are integrated by using only one camera module in such a miniaturized apparatus like the mobile terminal.

Figure 5:
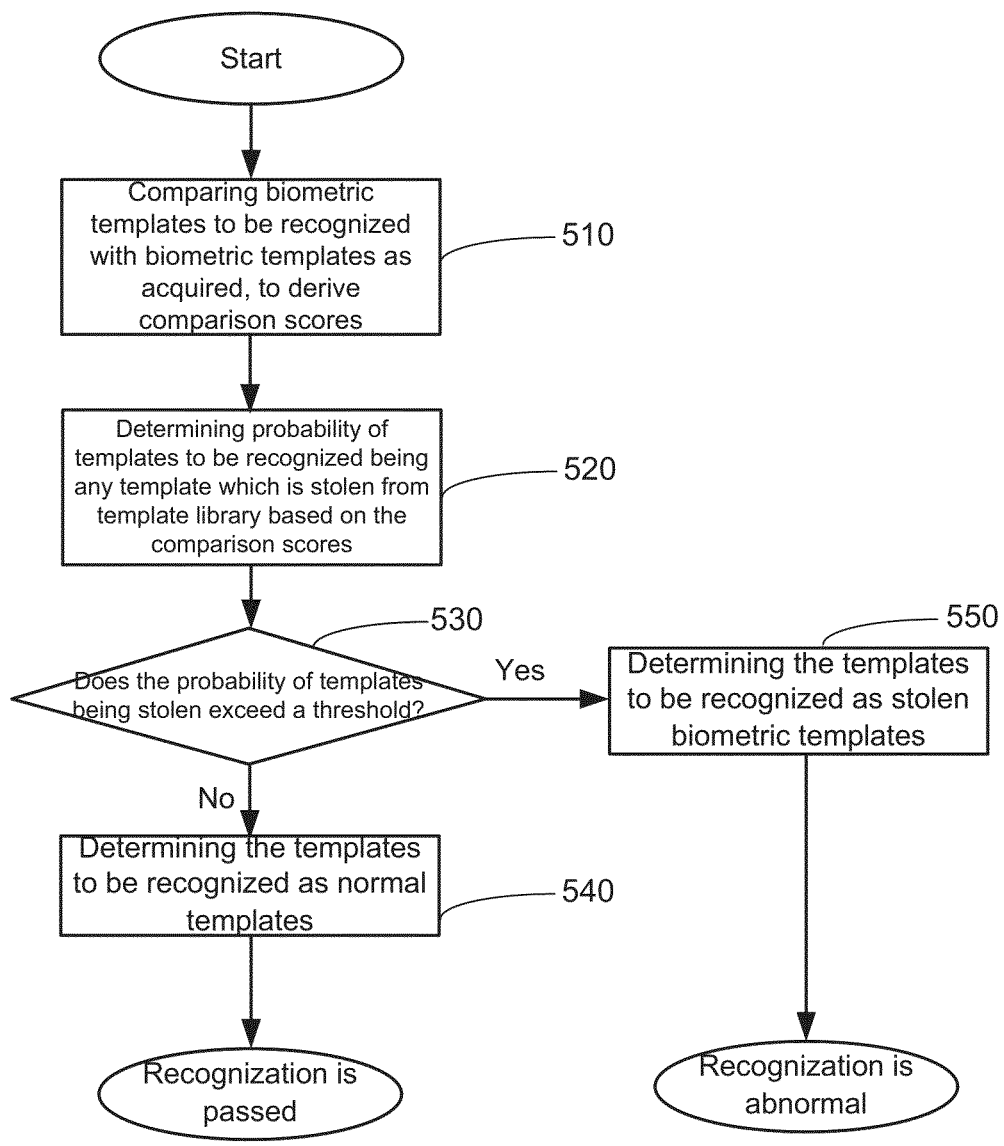
FIG. 5 schematically shows a flow chart of a method for biometric template anti-theft discrimination.

According to another embodiment of the present invention, the iris image analysis and processing module 130 of the present invention may also be used for recognizing the acquired iris images or feature templates extracted from the iris images, and performing the recognition in accordance with the following steps. FIG. 5 schematically shows a flow chart of a method for biometric template anti-theft discrimination of the present invention. As is shown in FIG. 5, the method comprises:

At Step 510, similarity comparison is made between each of N (N≥1) biometric templates to be recognized (namely N test samples, hereinafter referred to as templates to be recognized) and a single biometric template of the same user as acquired, to derive N comparison scores $s_1, s_2, \ldots, s_N$. Wherein, the biometric features may be any one selected from the group consisting of iris feature, fingerprint feature, facial feature, palm print feature, digital vein feature, palm vein feature, ophthalmic vein feature and voice feature or a combination thereof. The acquired biometric template refers to one or more biometric templates (hereinafter, referred to as template library) stored in the database which are generated through feature extraction algorithms according to biometric data logged by the user for one or more times when the user registers.

Methods adopted for calculation of similarity comparison scores are for example typical biometric feature extraction and comparison algorithms commonly known in the art such as sequencing measurement, Gabor, etc. Typically, the comparison score is dependent on the similarity between two templates compared. The greater the similarity is, the higher the comparison score is.

At Step 520, a probability of the templates to be recognized being any stolen templates from the templates library is calculated based on N comparison scores.

Functions for calculating the probability of the templates to be recognized being stolen templates may be any one of the following:

an addition function, for example:

$$f(s_1, \ldots, s_N) = \frac{1}{N}\sum_{i=1}^{N} s_i;$$

wherein $s_1, s_2, \ldots, s_N$ are the comparison scores calculated in step 510;

a multiplication function, for example:

$$f(s_1, \ldots, s_N) = \prod_{i=1}^{N} s_i;$$

a selection function, for example:

$$f(s_1, \ldots, s_N) = \max_i \{s_i\},$$

or $$f(s_1, \ldots, s_N) = \min_i \{s_i\};$$

The above functions are obtained based on machine learning methods (for example, SVM, Adaboost, etc.), which input the N comparison scores and output a probability result.

At Step 530, whether the probability of the templates to be recognized being stolen templates exceeds a threshold T is determined, if no, proceeding to 540; and if yes, proceeding to step 550. The threshold T may be set by a system administrator, for example according to experience, the number of historical templates existing in the template library or degree of sensitivity needing to be discriminated as required by the system, etc. For example, for occasions where template stealing occurs frequently, the threshold may be set relatively low to facilitate discrimination of the stolen feature templates.

At Step 540, the templates to be recognized are determined to be normal non-stolen biometric templates, and the recognition is determined to pass.

At Step 550, the templates to be recognized are determined to be templates stolen from the template library, and the recognition is determined to be abnormal.

According to the discrimination method of the present invention, as human body biometric features vary slightly with different acquisition time, corresponding templates generated are not completely identical (but the variation is still much smaller than the difference between human body biometric features of different identities). Therefore, when the templates to be recognized are stolen templates, as the stolen templates are completely consistent with a historical template of a user preserved in the template library, the similarity comparison score will be abnormally high, thus leading to an abnormally high probability of the templates to be recognized being discriminated as stolen templates. When the probability is higher than the threshold set, the feature templates may be discriminated to be stolen templates.

Preferably, the step 550 is followed by step 560 after the recognition is determined to be abnormal. When the templates to be recognized are discriminated as stolen templates, subsequent processing will be performed for the stolen biometric templates, for example deleting the stolen biometric templates from the template library. In particular, if the number of historical feature templates already existing in the template library is small, the user whose templates are stolen may be asked to reacquire and register the biometric features after deletion of the stolen biometric templates.

Or more preferably, the subsequent processing of the stolen templates may be performed in a revocable manner, that is, the user re-register to generate new revocable templates. Said revocation process uses a template conversion algorithm which is based on a variable parameter, to regenerate revocable biometric templates and store them in the database. The encryption or encoding process thereof may be regarded as a binary mapping process.

Preferably, a template conversion equation based on the variable parameter is, for example:

$$Feature'=f(Feature,\tau)$$

Wherein Feature represents the user's original biometric features, Feature' represents the revocable biometric templates generated, and τ is a variable parameter generated randomly. As τ changes, the revocable biometric templates generated are different. When the templates to be recognized are discriminated as stolen templates by using the method of the present invention, the encoded templates may be regenerated by changing τ and stored. In particular, during registration, the user's original biometric features will not be saved, that is, both the user and data management personnel cannot get the Feature, thereby ensuring the security of the original biometric templates.

Preferably, during the subsequent processing, corresponding alarming processing may also be activated.

Hereinafter, the process for user registration of biometric templates will be explained, which comprises:

At Step a, acquiring the user's biometric data, in particular, a plurality of the user's biometric data may be acquired at one or more times; and At Step b, generating biometric templates according to the currently acquired biometric data and store them in the database. Preferably, the template conversion algorithm which is based on the variable parameter is used to generate revocable biometric templates. Wherein, the template conversion equation based on the variable parameter is, for example:

$$Feature'=f(Feature,\tau)$$

Wherein Feature represents the user's original biometric features, Feature' represents the revocable biometric templates generated, and τ is the variable parameter generated randomly. As τ changes, the revocable biometric templates generated are different.

Figure 6:
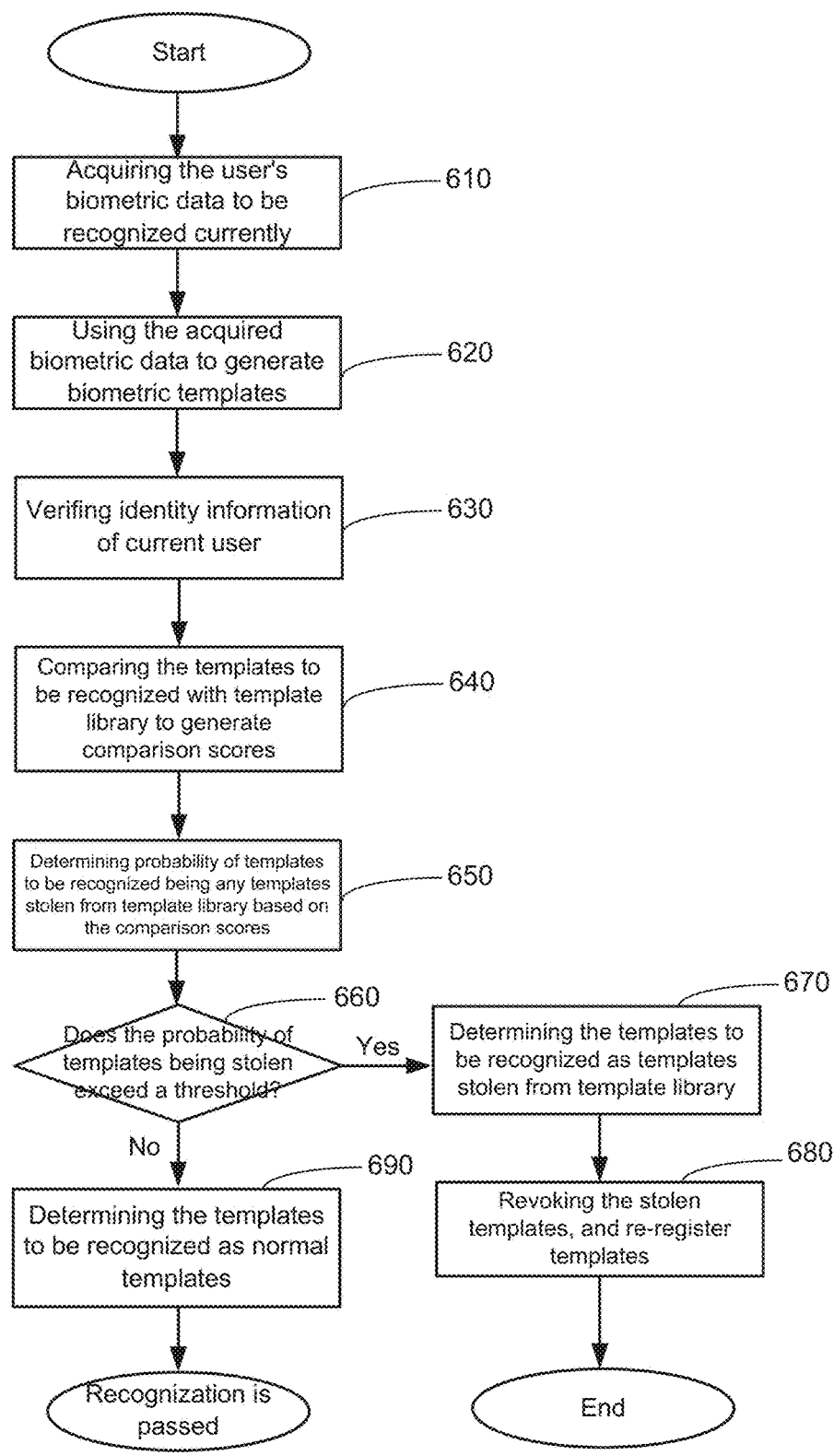
FIG. 6 schematically shows a flow chart of a method for identity recognition using the biometric template anti-theft discrimination method of the present invention.

FIG. 6 schematically shows a flow chart of a method for identity recognition using the biometric template anti-theft discrimination method of the present invention; As is shown in FIG. 6, the method comprises:

At Step 610, the user's biometric data to be recognized currently is acquired. Wherein, the user's biometric data to be recognized currently may be acquired using storage mediums (for example, a USB flash disk, photographs, printing papers, etc.) through a biometric feature acquisition and processing terminal or through network transmission, etc.

At Step 620, the currently acquired biometric data are converted into biometric template data to be recognized.

At Step 630, identity information of the current user is verified. The identity information of the current user may be verified in any one of the following two manners.

The first manner is to make a comparison between the templates to be recognized of the current user obtained in step 620 and each template set of all registered users in the template library to find the biometric templates matching with the templates to be recognized of the current user, thereby determining the identity information of the current user. Preferably, in order to reduce the computational load, comparison will be made between the templates to be recognized and any template of each template set of all registered users to derive the biometric templates matched therewith, thereby determining the identity information of the current user.

The second manner is to verify the user's identity information using other non-biometric recognition methods such as password authentication for user identity recognition, magnetic cards indicating the user's identity, etc. In particular, if the second manner is adopted, the user identity verification step may be performed before step 610.

At Step 640, a comparison is made between all templates to be recognized with a single template of the user template library to derive N comparison scores $s_1, s_2 \ldots s_N$. Here, the templates of the template library may be from the feature templates obtained by the user when registering.

At Step 650, the probability of the templates to be recognized being stolen templates is determined based on N comparison scores.

Functions for calculating the probability of the templates to be recognized being stolen templates may be any of the following:

an addition function, for example:

$$f(s_1, \ldots, s_N) = \frac{1}{N}\sum_{i=1}^{N} s_i;$$

a multiplication function, for example:

$$f(s_1, \ldots s_N) = \prod_{i=1}^{N} s_i;$$

a selection function, for example:

$$f(s_1, \ldots s_N) = \max_i \{s_i\},$$

or $$f(s_1, \ldots s_N) = \min_i \{s_i\};$$

functions obtained based on machine learning methods (for example, SVM, Adaboost, etc.) which input the N comparison scores and output a probability result.

At Step 660, whether the probability value obtained in step 650 exceeds the threshold T is determined, if yes, proceeding to step 670; and if no, proceeding to step 690.

Preferably, in step 660, in order to avoid accidental mis-determination, if the probability of the templates to be recognized being stolen templates is greater than the threshold, the method returns to step for recognition. If the probability of new templates to be recognized being templates stolen from the template library still exceeds the threshold, the method proceeds to step 670.

At Step 670, the templates to be recognized are determined to be templates stolen from the template library.

Preferably, the method may comprises step 680 for performing subsequent processing to the stolen templates, the processing may be deleting the stolen templates, asking the user to make new acquisition and registration, or revoking the stolen biometric templates, etc. Said subsequent processing is similar to step 560 of FIG. 1.

At Step 690, the templates to be recognized are determined to be normal biometric templates.

The following is an embodiment of detecting stolen templates at biometric feature background server side according to the method of the present invention. For example, a law-breaker Zhang steals the iris feature template of Li, a VIP customer of a system, which is stored in a background database server of the system using hacking techniques, and tries to use the template to attack an identity authentication system of the system. The method of the present invention is deployed in the iris recognition background server. On receiving the stolen feature template, the background server first compares the template with a template in a registered database, and determines that this template corresponds to the user Li. Then, the system continues to make multiple comparisons between the templates and a single registered feature template of Li to obtain N comparison scores, and inputs them into a forged and stolen template determination function g. As the current iris feature template is stolen from the registered template of the system, this template matches with a certain registered template completely when comparison is made. The function g outputs a value Q which is above the threshold. Thus, the method of the present invention determines that the current iris feature template is stolen from the template library, and an alarm is given. Meanwhile, the user Li is notified to revoke the stolen template and re-register new templates timely.

With the biometric template anti-theft discrimination method of the present invention, recognition and processing of forged and stolen biometric data and templates may be performed to the biometric recognition system in a simple and effective way.

The mobile terminal iris recognition device having the human-computer interaction mechanism of the present invention may be used to most mobile terminals, including a smart-phone, a tablet computer, an intelligent wearable apparatus, a smart watch, a smart glasses, a smart wristband, an intelligent door lock, etc. Implementations of the device on the smart-phone and tablet computer will be mainly described below.

Figure 7:
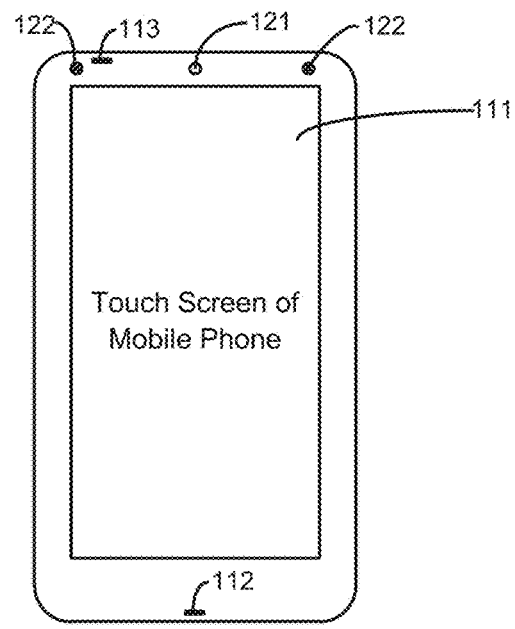
FIG. 7 shows an implementation of the mobile terminal iris recognition device in a mobile phone according to an embodiment of the present invention.

In the smart-phone shown in FIG. 7, the image acquisition unit 121 uses an 8-megapixel near-infrared phone imaging module, and the infrared lighting unit 122 uses a 750-850 nm near-infrared LED. The multi-touch display screen 111 uses the display screen of the smart-phone. The iris image analysis and processing module 130 and the feedback control module 140 use a self-contained master processor and a controller of the smart-phone, respectively. The power supply module 150 uses a self-contained lithium battery of the smart-phone.

Figure 8:
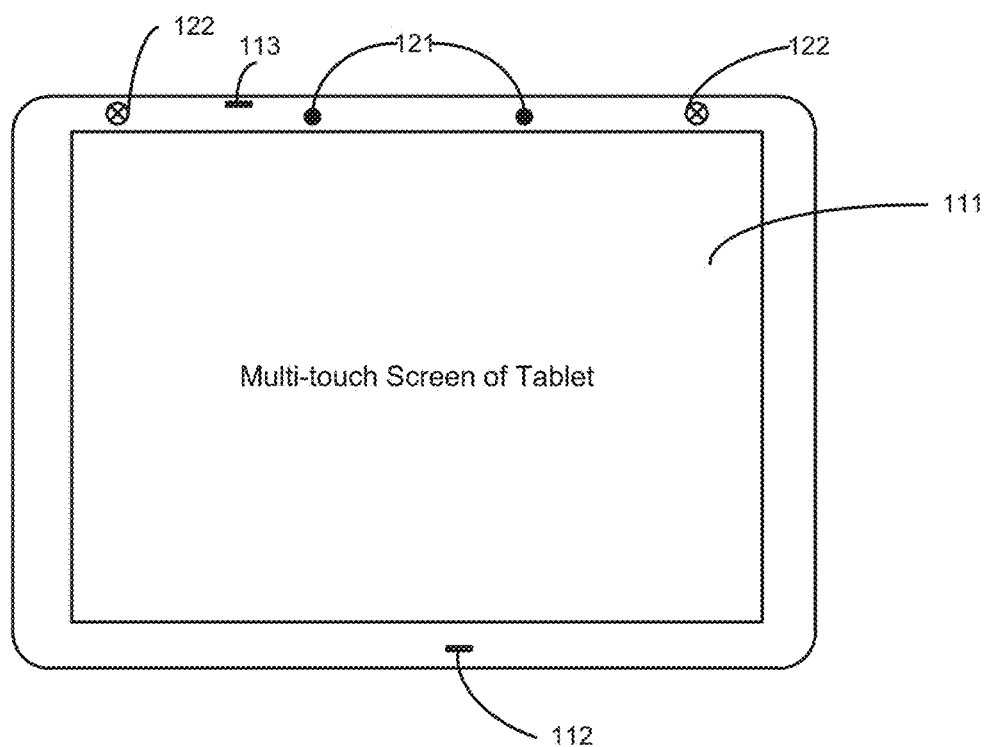
FIG. 8 shows an implementation of the mobile terminal iris recognition device in a tablet computer according to an embodiment of the present invention.

In the tablet computer shown in FIG. 8, the image acquisition unit 121 uses two 2-megapixel near-infrared phone imaging modules, and the infrared lighting unit 122 uses the 750-850 nm near-infrared LED. The multi-touch display screen 111 uses the display screen of the tablet computer. The iris image analysis and processing module 130 and the feedback control module 140 use a self-contained master processor and a controller of the tablet computer, respectively. The power supply module 150 uses a self-contained lithium battery of the tablet computer.

To sum up, compared with the prior art, the mobile terminal iris recognition device having the human-computer interaction mechanism of the present invention has made great improvements in such aspects as miniaturization, mobility and usability, and allows for a friendly interaction with the user, namely, the device is provided with a mobile terminal iris recognition function having an active visual, tactile and auditory interaction mechanism. Besides, the device has the advantages of high accuracy of iris recognition, low power consumption, reasonable structural layout, strong interaction functions, etc.

The drawings are merely schematic and have not been drawn to scale. Although the present invention has been described with reference to the preferred embodiments, but it is to be understood that the protection scope of the present invention is not limited to the embodiments described here.

Other embodiments will be conceivable and understood by those skilled in the art upon consideration of this description or from practice of the invention disclosed herein. The description and embodiments are merely exemplary, and the true scope and spirit are intended to be defined by the claims.

What is claimed is:

1. An iris recognition method for mobile terminal iris recognition device, the mobile terminal iris recognition device comprising an iris image analysis and processing module for recognizing iris images as acquired or feature templates extracted from the iris images, and the method comprising following steps:
    a) performing similarity comparisons between the iris images or feature templates and at least one existing template of a user template library to obtain an comparison score;
    b) calculating the probability of the feature templates being stolen templates based on the comparison score;
    c) determining whether the probability exceeds a threshold, if no, proceeding to step d; and if yes, proceeding to step e;
    d) determining the feature templates as normal feature templates, and determining the recognition as a pass; and
    e) determining the feature templates as stolen templates and the recognition as abnormal.

2. The iris recognition method according to claim 1, wherein N iris images acquired from the user are compared with templates already existing in a user template library to derive corresponding comparison scores $S_i$, and whether the corresponding iris images are stolen templates is determined through calculation using a comparison score weighting function based on the comparison scores $S_i$.

3. The iris recognition method according to claim 1, wherein in the step b, the function for determining the probability of the feature templates being stolen templates based on the comparison scores is selected from any one of the following:

an addition function expressed as the following equation:

$$f(s_1, \ldots, s_N) = \frac{1}{N}\sum_{i=1}^{N} s_i;$$

a multiplication function expressed as the following equation:

$$f(s_1, \ldots s_N) = \prod_{i=1}^{N} s_i;$$

and a selection function expressed as the following equation:

$$f(s_1, \ldots s_N) = \max_i \{s_i\},$$

or $$f(s_1, \ldots s_N) = \min_i \{s_i\};$$

or a function acquired by machine learning techniques, wherein $s_1, s_2, \ldots, s_N$ are comparison scores, and N is the number of test samples.

4. The iris recognition method according to claim 1, wherein the threshold is set according to experience, the number of historical templates existing in the template library or degree of sensitivity to be discriminated as required by the system.

5. The iris recognition method according to claim 1, wherein step e is followed by step f which is a subsequent processing performed to the stolen feature templates, the processing being selected from any one or more of the following:
- f1) deleting the stolen feature templates from the template library;
- f2) asking the user whose template is stolen to re-acquire and register iris features; and
- f3) revoking the stolen templates using a template conversion algorithm which is based on a variable parameter and regenerating new feature templates to replace the original templates.

6. The iris recognition method according to claim 1, wherein the template conversion algorithm in step f3 is:

$$Feature'=f(Feature, \tau),$$

wherein Feature represents the user's original features, Feature' represents the feature templates generated, and $\tau$ is the variable parameter generated randomly.

7. A smart apparatus using the method according to claim 1, the smart apparatus being any one selected from the group consisting of a smart phone, a tablet computer, a smart wearable apparatus, a smart watch, smart glasses, a smart wristband, a smart door lock.

* * * * *